US011063820B2

(12) United States Patent
Kim et al.

(10) Patent No.: US 11,063,820 B2
(45) Date of Patent: Jul. 13, 2021

(54) METHOD AND APPARATUS FOR CONFIGURING NETWORK CONNECTION IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 16/537,202

(22) Filed: Aug. 9, 2019

(65) Prior Publication Data
US 2020/0052963 A1 Feb. 13, 2020

(30) Foreign Application Priority Data
Aug. 9, 2018 (KR) .......... 10-2018-0093375

(51) Int. Cl.
H04L 12/24 (2006.01)
H04W 48/02 (2009.01)
(Continued)

(52) U.S. Cl.
CPC ......... *H04L 41/0806* (2013.01); *H04W 48/02* (2013.01); *H04W 76/10* (2018.02); *H04W 84/042* (2013.01)

(58) Field of Classification Search
CPC .. H04L 41/0806; H04W 48/02; H04W 76/10; H04W 84/042
See application file for complete search history.

(56) References Cited

U.S. PATENT DOCUMENTS 8,983,431 B2  3/2015 Lee et al.
2013/0051325 A1* 2/2013 Ryu ................. H04W 74/0833
                                                                370/328
(Continued)

FOREIGN PATENT DOCUMENTS

KR    10-1871720 B1    6/2018
WO    2016118104 A1    7/2016

OTHER PUBLICATIONS

ISA/KR, International Search Report and Written Opinion of the International Searching Authority, International Application No. PCT/KR2019/010097, dated Nov. 18, 2019, 11 pages.
3GPP TS 36.331 V15.2.2 (Jun. 2018), Technical Specification, 3rd Generation Partnership Project; Technical Specification Group Radio Access Network; Evolved Universal Terrestrial Radio Access (E-UTRA); Radio Resource control (RRC); Protocol specification (Release 15), Jun. 2018, 791 pages.
(Continued)

*Primary Examiner* — Kashif Siddiqui

(57) ABSTRACT

Provided is a method, performed by a user equipment (UE), of controlling an access, the method including receiving, through system information from a base station, barring information including a barring configuration information list and a public land mobile network (PLMN)-specific barring information list, the barring configuration information list including at least one barring configuration information and the PLMN-specific barring information list including at least one barring information per PLMN and performing a barring check based on the received barring information when the access is triggered, in which the barring configuration information corresponds to one barring configuration information index according to an order of being included to the barring configuration information list.

18 Claims, 20 Drawing Sheets

(51) Int. Cl.
*H04W 76/10* (2018.01)
*H04W 84/04* (2009.01)

(56) References Cited

U.S. PATENT DOCUMENTS

| | | | | |
|---|---|---|---|---|
| 2014/0128029 | A1* | 5/2014 | Fong | H04W 48/10 |
| | | | | 455/411 |
| 2019/0150061 | A1* | 5/2019 | Ishii | H04W 48/18 |
| | | | | 370/329 |
| 2019/0394702 | A1* | 12/2019 | Hoglund | H04W 76/38 |
| 2020/0169863 | A1* | 5/2020 | Kim | H04W 76/50 |
| 2020/0221369 | A1* | 7/2020 | Adjakple | H04W 48/02 |
| 2020/0314943 | A1* | 10/2020 | Kim | H04W 48/08 |

OTHER PUBLICATIONS

3GPP TS 38.331 V15.3.0 (Sep. 2018), Technical Specification, 3rd Generation Partnership Project; Technical Specification Group Radio Access Network; NR; Radio Resource Control (RRC) protocol specification (Release 15), Jun. 2018, 445 pages.
Ericsson (Rapporteur), R2-1810388, 3GPP TSG-WG2 Meeting #102AH, Montreal, Canada, Jul. 2-6, 2018, 388 pages.
Samsung (Rapporteur), R2-1810773, 3GPP TSG WG2 NR AH 1807, Montreal, Canada, Jul. 2-6, 2018, 897 pages.
Ericsson (Rapporteur), "Introduction of SA," R2-1813492, 3GPP TSG-WG2 Meeting #103, Gothenburg, Sweden, Aug. 20-24, 2018, 465 pages.

* cited by examiner

METHOD AND APPARATUS FOR CONFIGURING NETWORK CONNECTION IN MOBILE COMMUNICATION SYSTEM

CROSS-REFERENCE TO RELATED APPLICATION

This application is based on and claims priority under 35 U.S.C. § 119 to Korean Patent Application No. 10-2018-0093375, filed on Aug. 9, 2018, in the Korean Intellectual Property Office, the disclosure of which is incorporated by reference herein in its entirety.

BACKGROUND

1. Field

The disclosure relates to a method and apparatus for configuring a network connection in a mobile communication system.

2. Description of the Related Art

To meet the soaring demand with respect to wireless data traffic because the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as a beyond-4G-network communication systems or a post-long term evolution (LTE) systems. The 5G communication system prescribed in the $3^{rd}$ Generation Partnership Project (3GPP) is called a new radio (NR) system. For higher data transmission rates, the implementation of 5G communication systems on ultra-high frequency bands (mmWave), e.g., 60 GHz, is being considered. In 5G communication systems, beamforming, massive multi-input multi-output (MIMO), full dimensional MIMO (FD-MIMO), an array antenna, analog beamforming, and large-scale antenna technologies have been discussed as ways of alleviating propagation path loss and increasing propagation distances in ultra-high frequency bands, and have also been applied to NR systems. For system network improvement, in 5G communication systems, technologies such as evolved small cell, advanced small cell, cloud Radio Access Network (RAN), ultra-dense network, Device to Device (D2D) communication, wireless backhaul, moving network, cooperative communication, Coordinated Multi-Points (CoMPs), and interference cancellation have been developed. In a 5G system, Advanced Coding Modulation (ACM) schemes including hybrid Frequency-Shift Keying (FSK) and Quadrature Amplitude Modulation (QAM) Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. In order to implement IoT, technological elements, such as sensing technology, wired/wireless communication and network infrastructure, service interface technology, and security technology, are required, and in this regard, technologies such as sensor networks, machine to machine (M2M), machine-type communication (MTC), and so forth have recently been researched for connection between things. Such an IoT environment may provide intelligent Internet technology (IT) services that create new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, etc., has been implemented by a scheme such as beamforming, MIMO, an array antenna, and so forth. The application of cloud RAN as a Big Data processing technology may also be an example of the convergence of 5G technology and IoT technology.

As described above, various services may be provided as mobile communication systems develop, and accordingly, ways of effectively providing such services are required.

SUMMARY

Disclosed embodiments of the disclosure provide a method and apparatus for effectively providing a service in a mobile communication system.

Additional aspects will be set forth in part in the description which follows and, in part, will be apparent from the description, or may be learned by practice of the presented embodiments of the disclosure.

According to an aspect of the disclosure, a method, performed by a user equipment (UE), of controlling an access includes receiving, through system information from a base station, barring information including a barring configuration information list and a public land mobile network (PLMN)-specific barring information list, the barring configuration information list including at least one barring configuration information and the PLMN-specific barring information list including at least one barring information per PLMN and performing barring check based on the received barring information when the access is triggered, in which the barring configuration information corresponds to one barring configuration information index according to an order of being included in the barring configuration information list.

According to an embodiment of the disclosure, the barring information per PLMN may include a PLMN identification (ID) index and barring list type information, and the performing of the barring check may include in response to the barring list type information indicating an implicit barring list, performing the barring check based on barring configuration information corresponding to the barring configuration information index mapped to the triggered access included in the implicit barring list.

According to an embodiment of the disclosure, the method may further include determining to allow the access without performing the barring check, when there is no barring configuration information corresponding to the barring configuration information index mapped to the triggered access.

According to an embodiment of the disclosure, an explicit barring list may include at least one category-specific barring information, each category-specific barring information including access category information and the barring configuration information index; and the performing of the barring check may include in response to the barring list type information indicating the explicit barring list, performing the barring check based on barring configuration information corresponding to the barring configuration information index for the access category information corresponding to the triggered access.

According to an embodiment of the disclosure, a maximum number of barring configuration information able to be included in the barring configuration information list may be 8.

According to an embodiment of the disclosure, the barring configuration information may include barring information regarding a barring factor, a barring time, and an access identity.

According to an embodiment of the disclosure, the method may further include receiving, through an operations, administration, and maintenance (OAM) message or a non-access stratum (NAS) message from the base station, information regarding an operator-specific access category, in which the performing of the barring check may include triggering the access, mapping the triggered access to an access identity and an access category based on information about the information regarding the operator-specific access category, and performing the barring check based on the access identity and the access category.

According to an embodiment of the disclosure, the method may further include delaying the access when the access is not allowed according to the barring check.

According to another aspect of the disclosure, a method, performed by a base station, of controlling an access in a mobile communication system includes determining whether to use an implicit barring list or an explicit barring list, based on a preset criterion, generating the implicit barring list including at least one barring configuration information index corresponding to at least one access category when determining to use the implicit barring list or generating the explicit barring list including at least one category-specific barring information, each category-specific barring information including access category information and the barring configuration information index when determining to use the explicit barring list, and broadcasting, through system information, barring information comprising a barring configuration information list, the barring configuration information list comprising barring configuration information, the barring information further including at least one of the implicit barring list or the explicit barring list, in which the barring configuration information corresponds to one barring configuration information index according to an order of being included in the barring configuration information list.

According to an embodiment of the disclosure, the method may further include generating the implicit barring list by mapping a barring configuration information index that is not mapped to the barring configuration information, to an access-allowed access category without performing the barring check, when determining to use the implicit barring list.

According to another aspect of the disclosure, a user equipment (UE) controlling an access in a mobile communication system includes a communication unit and a controller configured to receive, through system information from a base station, barring information including a barring configuration information list and a public land mobile network (PLMN)-specific barring information list, the barring configuration information list including at least one barring configuration information and the PLMN-specific barring information list including at least one barring information per PLMN and to perform a barring check based on the received barring information when the access is triggered, in which the barring configuration information corresponds to one barring configuration information index according to an order of being included in the barring configuration information list.

According to an embodiment of the disclosure, the barring information per PLMN may include a PLMN identification (ID) index and barring list type information, and the controller may be configured in response to the barring list type information indicating an implicit barring list, to perform the barring check based on barring configuration information corresponding to the barring configuration information index mapped to the triggered access included in the implicit barring list.

According to an embodiment of the disclosure, the controller may be further configured to determine to allow the access without performing the barring check, when there is no barring configuration information corresponding to the barring configuration information index mapped to the triggered access.

According to an embodiment of the disclosure, an explicit barring list may include at least one category-specific barring information, each category-specific barring information including access category information and the barring configuration information index, and the controller may be further configured to, in response to the barring list type information indicating the explicit barring list, perform the barring check based on barring configuration information corresponding to the barring configuration information index for the access category information corresponding to the triggered access.

According to an embodiment of the disclosure, a maximum number of barring configuration information able to be included in the barring configuration information list is 8.

According to an embodiment of the disclosure, the barring configuration information may include barring information regarding a barring factor, a barring time, and an access identity.

According to an embodiment of the disclosure, the controller may be further configured to receive, through an operations, administration, and maintenance (OAM) message or a non-access stratum (NAS) message from the base station, information regarding an operator-specific access category, trigger the access, map the triggered access to an access identity and an access category based on information about the information regarding the operator-specific access category, and perform the barring check based on the access identity and the access category.

According to an embodiment of the disclosure, the controller may be further configured to delay the access when the access is not allowed according to the barring check.

According to another aspect of the disclosure, a base station controlling an access in a mobile communication system includes a communication unit and a controller configured to determine whether to use an implicit barring list or an explicit barring list, based on a preset criterion, to generate the implicit barring list including at least one barring configuration information index corresponding to at least one access category when determining to use the implicit barring list or generating the explicit barring list including at least one category-specific barring information, each including access category information and the barring configuration information index when determining to use the explicit barring list, and to broadcast, through system information, barring information comprising a barring configuration information list, the barring configuration information list comprising barring configuration information, the barring information further including at least one of the implicit barring list or the explicit barring list, in which the barring configuration information corresponds to one barring configuration information index according to an order of being included in the barring configuration information list.

According to an embodiment of the disclosure, the controller may be further configured to generate the implicit barring list by mapping a barring configuration information index that is not mapped to the barring configuration information, to an access-allowed access category without performing the barring check, when determining to use the implicit barring list.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
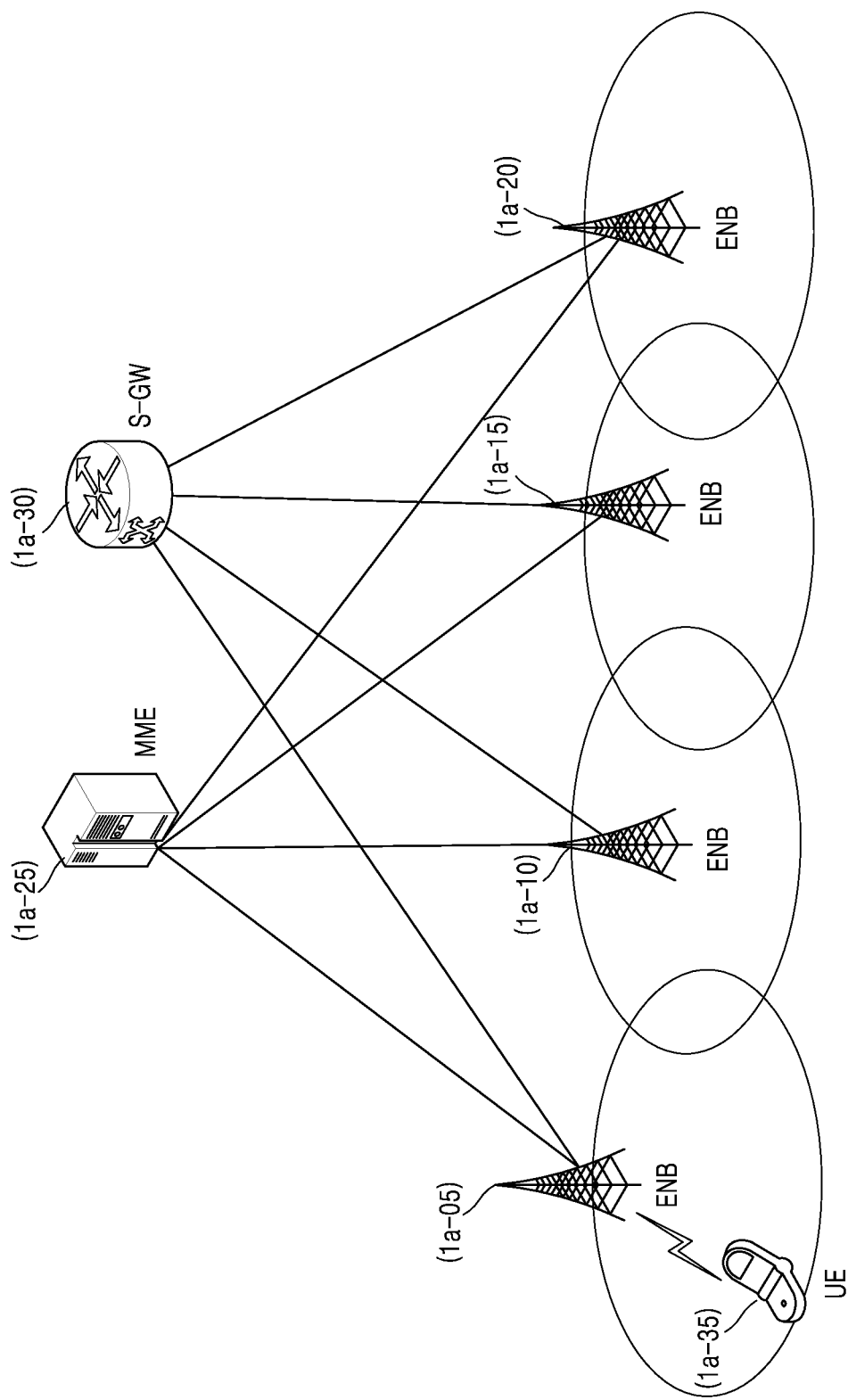
FIG. 1 illustrates a structure of an LTE system.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be disclosed with reference to the accompanying drawings.

When embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments of the disclosure, but may be implemented in various ways, and the embodiments of the disclosure are provided to complete the disclosure and to allow those of ordinary skill in the art to understand the scope of the disclosure. The disclosure is defined by the category of the claims. Throughout the specification, an identical reference numeral will indicate an identical element.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment of the disclosure, the term '~unit', as used herein, denotes a software or hardware component, such as a Field Programmable Gate Array (FPGA) or Application Specific Integrated Circuit (ASIC), which performs certain tasks. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments of the disclosure, '~unit' may include one or more processors.

Throughout the disclosure, the expression "at least one of a, b or c" indicates only a, only b, only c, both a and b, both a and c, both b and c, all of a, b, and c, or variations thereof As used in the following description, a term for identifying an access node, terms referring to network entities, terms referring to messages, a term referring to an interface between network objects, and terms referring to various identification information are illustrated for convenience of explanation. Therefore, the disclosure is not limited by the following terms, and other terms referring to objects having equivalent technical meanings may be used.

In the disclosure, for convenience of description, the disclosure uses terms and names defined in standards regarding $5^{th}$-Generation (5G), New Radio (NR), or Long Term Evolution (LTE) systems. However, the disclosure is not limited by such terms and names, and may be equally applied to systems complying with other standards.

While a description will be focused on a communication standard specified by the 3GPP, when embodiments of the disclosure are described in detail, a main subject matter to be claimed in the specification is also applicable to other communication systems and services having a similar technical background without significantly departing from a range disclosed herein, as will be obvious to those of ordinary skill in the art.

In a next-generation mobile communication system (5G or NR system), more various types of wireless communication devices as well as mobile phones, Node B (NB)-Internet of Things (IoT) devices, and sensors may configure a connection to a network. Therefore, to manage numerous wireless communication devices, a next-generation mobile communication system needs to introduce a new identifier having a larger space and assign different identifiers to manage wireless communication devices. However, when new identifiers having larger spaces are introduced, wireless communication devices assigned with the new identifiers need to provide a method of delivering the new identifiers to a network based on a circumstance.

The following description will be made of a method and apparatus for, by a UE, processing a new identifier provided from a network, in a network access stage, a state transition stage, a network reconfiguration stage, etc. Throughout the specification, a layer may also be referred to as an entity.

FIG. 1 illustrates a structure of an LTE system.

Referring to FIG. 1, a radio access network of the LTE system may include a plurality of evolved nodes B (eNB, Node B, or base station) 1a-05, 1a-10, 1a-15, and 1a-20, a mobility management entity (MME) 1a-25, and a serving gateway (S-GW) 1a-30. A user equipment (UE or terminal) 1a-35 may access an external network through the eNBs 1a-05, 1a-10, 1a-15, and 1a-20 and the S-GW 1a-30.

The eNBs (Nodes B or base stations) 1a-05, 1a-10, 1a-15, and 1a-20 may provide, as access nodes of a cellular network, radio accesses to UEs accessing the network. That is, the eNBs 1a-05, 1a-10, 1a-15, and 1a-20 collect state information, such as UEs' buffer statuses, available transmission power states, and channel states, perform scheduling, and support connections between the UEs and a core network (CN), so as to provide a traffic service of users.

The eNBs 1a-05, 1a-10, 1a-15, and 1a-20 correspond to existing Nodes B in a Universal Mobile Telecommunication System (UMTS) system. The eNBs 1a-05 may be connected with the UE 1a-35 through a radio channel and play more complicated roles than the existing Node B. In the LTE system, every user traffic as well as a real-time service such as voice over Internet protocol (VoIP) is provided through a shared channel, requiring a device for collecting state information of UEs, such as a buffer state, an available transmit power state, a channel state, etc., and performing scheduling based on the state information, and examples of such a device may be the eNBs 1a-05, 1a-10, 1a-15, and 1a-20. One eNB may generally control multiple cells. The LTE system may use, for example, orthogonal frequency division multiplexing (OFDM) as a wireless connection scheme. Also, adaptive modulation & coding (AMC) may be used in which a modulation scheme and a channel coding rate are determined depending on a channel state of a UE.

The MME 1a-25 is in charge of various control functions as well as a mobility management function for the UE, and is connected with the plurality of ENBs. The S-GW 1a-30 may be a device that provides a data bearer. The MME 1a-25 and the S-GW 1a-30 may perform authentication, bearer management, etc., with respect to a UE accessing the network, and process a packet having arrived from the eNBs 1a-05, 1a-10, 1a-15, and 1a-20 or packets to be delivered to the eNBs 1a-05, 1a-10, 1a-15, and 1a-20.

Figure 2:
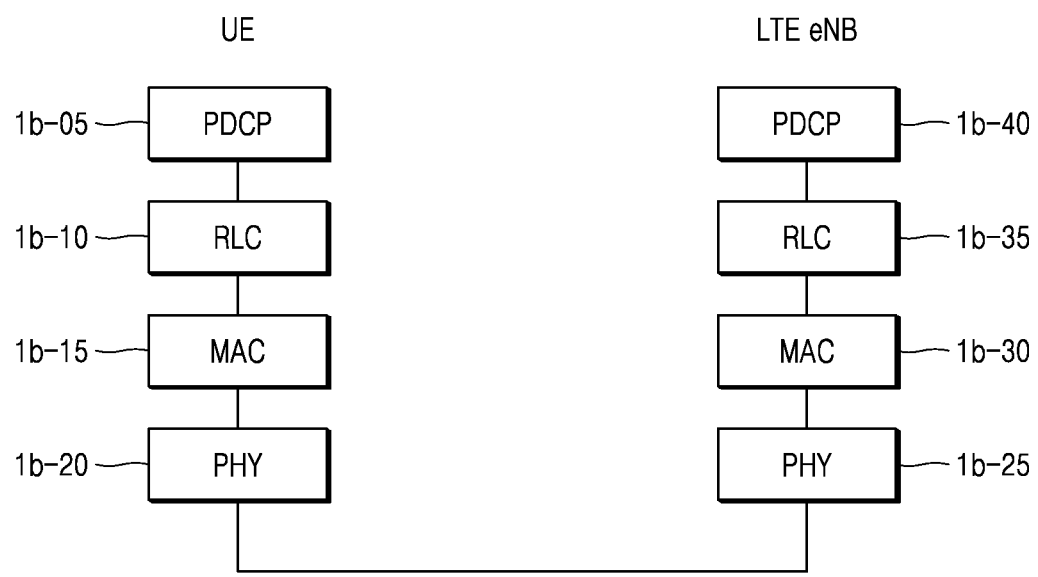
FIG. 2 illustrates a radio protocol architecture in an LTE system.

FIG. 2 illustrates a radio protocol architecture in an LTE system.

Referring to FIG. 2, a radio protocol of the LTE system may include packet data convergence protocols (PDCPs) 1b-05 and 1b-40, radio link controls (RLCs) 1b-10 and 1b-35, and medium access controls (MACs) 1b-15 and 1b-30, respectively, at a UE and an eNB. The PDCPs 1b-05 and 1b-40 are responsible for IP header compression/decompression or the like. Main functions of the PDCPs are summarized as follows:

Header compression and decompression: (ROHC only)
Transfer of user data
In-sequence delivery of upper-layer PDUs at PDCP re-establishment procedure for RLC AM
For split bearers in DC (only support for RLC AM): PDCP PDU routing for transmission and PDCP PDU reordering for reception
Duplicate detection of lower-layer SDUs at PDCP re-establishment procedure for RLCAM
Retransmission of PDCP SDUs at handover and, for split bearers in DC, of PDCP PDUs at PDCP data-recovery procedure, for RLC AM
Ciphering and deciphering
Timer-based SDU discard in uplink The RLCs 1b-10 and 1b-35 may reconstruct a PDCP packet data unit (PDU) into a proper size and perform an automatic request for repetition (ARQ) operation. Main functions of the RLCs are summarized as follows:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 1b-15 and 1b-30 may be connected to a plurality of RLC-layer devices configured in one UE, multiplex RLC PDUs into a MAC PDU, and demultiplex an MAC PDU into RLC PDUs. Main functions of the MACs are summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical (PHY) layers 1b-20 and 1b-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer.

Although not shown in FIG. 2, a radio resource control (RRC) layer may exist on the PDCP layers of the UE and the eNB, respectively, and the RRC layer may exchange a configuration control message related to access or measurement for radio resource control.

Figure 3:
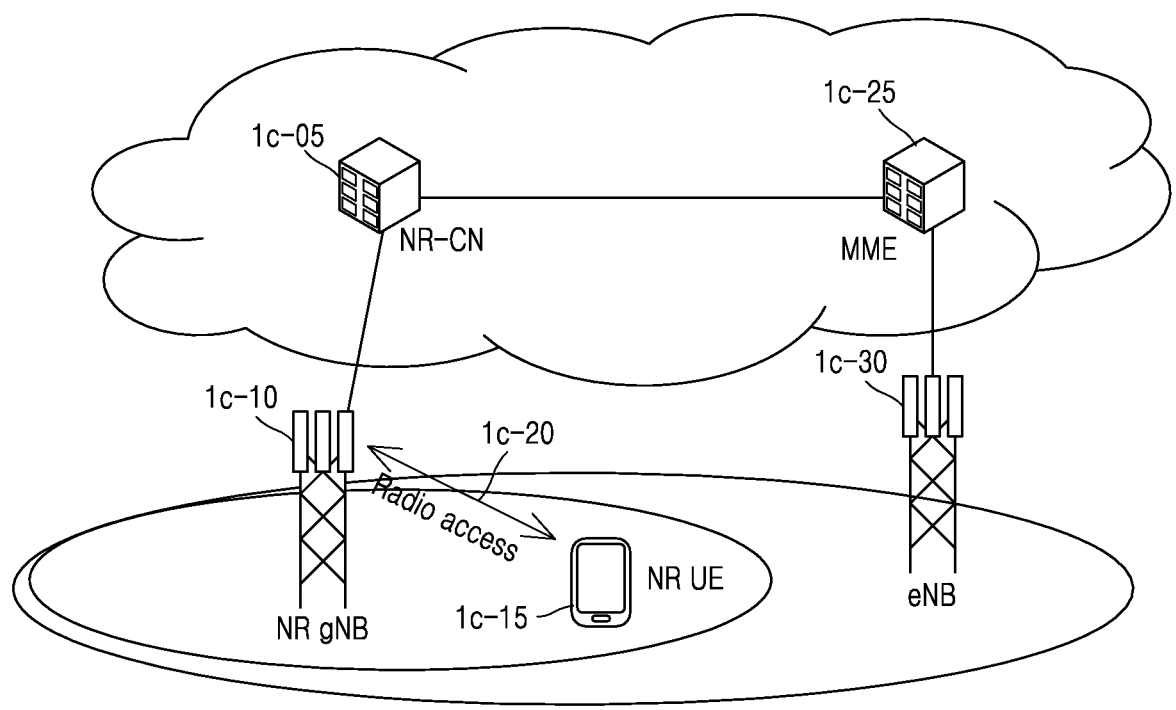
FIG. 3 illustrates a structure of a next-generation mobile communication system to which an embodiment of the disclosure is applied.

FIG. 3 illustrates a structure of a next-generation mobile communication system to which an embodiment of the disclosure is applied.

Referring to FIG. 3, a radio access network of the next-generation mobile communication system (5G or NR system) may include a new radio node B (NR NB, NR gNB, or NR eNB) 1c-10 and a new radio core network (NR CN or a next generation core network (NG CN) 1c-05. A new radio user equipment (NR UE or UE) 1c-15 may access an external network through the NR gNB 1c-10 and the NR CN 1c-05.

In FIG. 3, the NR gNB 1c-10 may correspond to an evolved Node B (eNB) of an LTE system. The NR gNB 1c-10 may be connected to the NR UE 1c-15 over a radio channel and may provide a more advanced service than that of the existing Node B. In the next-generation mobile communication system, all user traffic is served through a shared channel, requiring a device that collects state information, such as UEs' buffer status, available transmission power state, and channel state, and performs scheduling, in which the NR gNB 1c-10 may be responsible for these functions. One NR gNB 1c-10 may generally control a plurality of cells, and include a central unit (CU) managing control and signaling and a distributed unit (DU) in charge of signal transmission/reception. In order to realize ultra-high-speed data transmission compared to an LTE system, the next-generation mobile communication system (5G or NR system) may have a maximum bandwidth greater than the existing maximum bandwidth and may employ a beam-forming technique in addition to OFDM as a radio access technology. Also, adaptive modulation & coding (AMC) may be used in which a modulation scheme and a channel coding rate are determined based on a channel state of a UE. The NR CN 1c-05 may perform functions such as mobility support, bearer setup, QoS setup, etc. The NR CN 1c-05 may be a device that performs not only a mobility management function for a UE but also various control functions and may be connected to a plurality of base stations. The next-generation mobile communication system (5G or NR system) may also interwork with the existing LTE system, in which the NR CN 1c-105 may be connected to an MME 1c-25 through a network interface. The MME 1c-25 may be connected to the eNB 1c-30, which is an existing eNB.

Figure 4:
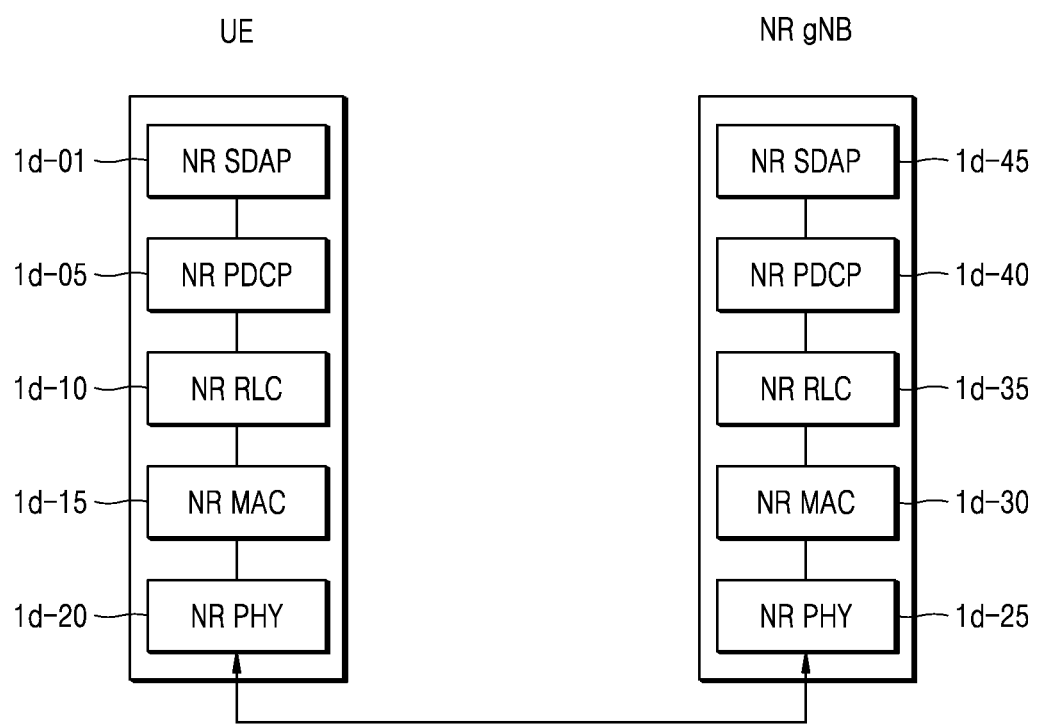
FIG. 4 illustrates a radio protocol architecture of a next-generation mobile communication system to which an embodiment of the disclosure is applied.

FIG. 4 illustrates a radio protocol architecture of a next-generation mobile communication system to which an embodiment of the disclosure is applied.

Referring to FIG. 4, a radio protocol of the next-generation mobile communication system (5G or NR system) may include NR SDAPs 1d-01 and 1d-45, NR PDCPs 1d-05 and 1d-40, NR RLCs 1d-10 and 1d-35, and NR MACs 1d-15 and 1d-30, respectively at a UE and an NR gNB.

Main functions of the NR SDAPs 1d-01 and 1d-45 may include some of the following functions:
 Transfer of user plane data
 Mapping between a QoS flow and a DRB for both DL and UL
 Marking QoS flow identification (ID) in both DL and UL packets
 Mapping of reflective QoS flow to DRB for the UL SDAP PDUs For an SDAP layer device, a UE may be set whether to use a header of an SDAP layer device or a function of the SDAP layer device for each PDCP layer device or each bearer or logical channel through an RRC message. When an SDAP header is set, it may be indicated using a network attached storage (NAS) QoS reflective configuration 1-bit indicator (NAS reflective QoS) and an AS QoS reflective configuration 1-bit indicator (AS reflective QoS) that the UE may update or reconfigure a QoS flow of an uplink and a downlink and mapping information regarding a data bearer. The SDAP header may include QoS flow ID information indicating a QoS. The QoS information may be used as data processing priority information, scheduling information, etc., for supporting a smooth service.

Main functions of the NR PDCPs 1d-05 and 1d-40 may include some of the following functions:
 Header compression and decompression: (ROHC only)
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink)

Herein, the reordering function of the NR PDCP devices refers to a function of rearranging PDCP PDUs received in a lower layer in order based on a PDCP sequence number (SN), and may include a function of transmitting data to an upper layer in the order of rearrangement or a function of immediately transmitting the data regardless of order, and may also include a function of recording lost PDCP PDUs through reordering, a function of reporting the state of lost PDCP PDUs to a transmitter, and a function of requesting retransmission of lost PDCP PDUs.

Main functions of the NR RLCs 1d-10 and 1d-35 may include some of the following functions:
 Transfer of upper layer PDUs
 In-sequence delivery of upper layer PDUs
 Out-of-sequence delivery of upper layer PDUs
 Error correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment Herein, the in-sequence delivery function of the NR RLC devices refers to a function of delivering RLC SDUs received from a lower layer to an upper layer in order. More specifically, the in-sequence delivery function of the NR RLC devices may include a function of re-assembling and delivering a plurality of RLC SDUs when one original RLCSDU is divided into the plurality of RLC SDUs to be received, a function of rearranging received RLC PDUs based on the RLC SN or the PDCP SN, a function of recording lost RLC PDUs through reordering, a function of reporting the state of lost RLC PDUs to a transmitter, a function of requesting retransmission of lost RLC PDUs, a function of delivering only RLC SDUs before a lost RLC SDU to an upper layer in order in case of the presence of the lost RLC SDU, a function of delivering all RLC SDUs, received before a timer starts, to an upper layer in order when the timer has expired despite the presence of a lost RLC SDU, and a function of delivering all RLC SDUs received so far to an upper layer in order when the timer expires despite the presence of a lost RLC SDU.

The NR RLC devices may process RLC PDUs in order of reception (the order of arrival regardless of the order of SNs) and deliver the RLC PDUs to the PDCP devices in an out-of-sequence manner, and for a segment, the NR RLC devices may receive segments that are stored in a buffer or are to be received later, may reconstruct the segment into one whole RLC PDU, may process the RLC PDU, and may deliver the RLC PDU to the PDCP devices. The NR RLC layers may not include a concatenation function, and the concatenation function may be performed in the NR MAC layers or may be replaced with a multiplexing function of the NR MAC layers.

Herein, the out-of-sequence delivery function of the NR RLC devices refers to a function of delivering RLC SDUs received from a lower layer directly to an upper layer regardless of order, and may include a function of re-assembling and delivering a plurality of RLC SDUs when one original RLC SDU is divided into the plurality of RLC SDUs to be received, and a function of recording lost RLC PDUs by storing and reordering the RLC SNs or PDCP SNs of received RLC PDUs.

The NR MACs 1d-15 and 1d-30 may be connected to a plurality of NR RLC-layer devices configured in one UE, and main functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHYs 1d-20 and 1d-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer.

Figure 5:
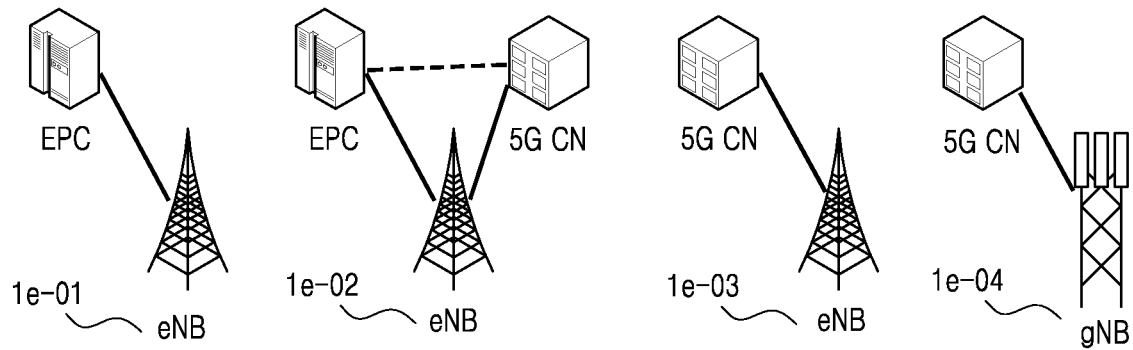
FIG. 5 illustrates a connection relationship among an LTE base station (evolved node B, eNB), a new radio (NR) base station (next generation node B, gNB), an evolved packet core (EPC, LTE core network), and a 5G core network (CN, NR core network), supported by each of an LTE system and a next-generation mobile communication system to which an embodiment of the disclosure is applied.

FIG. 5 illustrates a connection relationship among an LTE base station (eNB), an NR base station (gNB), an EPC (LTE core network), and a 5G CN (NR core network), supported by each of an LTE system and a next-generation mobile communication system to which an embodiment of the disclosure is applied.

An EPC may be a network including an MME, and a 5G CN may be a network including an access management function (AMF).

Referring to FIG. 5, there may be various connection relationships such as a case where an LTE eNB is connected to an EPC as indicated by 1e-01, a case where an LTE eNB are connected to both an EPC and a 5G CN as indicated by 1e-02, a case where an LTE eNB is connected to a 5G CN as indicated by 1e-03, and a case where an NR gNB is connected to a 5G CN as indicated by 1e-04.

In the disclosure, a description will be made of a network connection method and RRC message information for a UE, in which various connection relationships may be supported including connection relationships among an LTE eNB, an NR gNB, an EPC (LTE core network), and a 5G CN (NR core network) described in FIG. 5.

Figure 6:
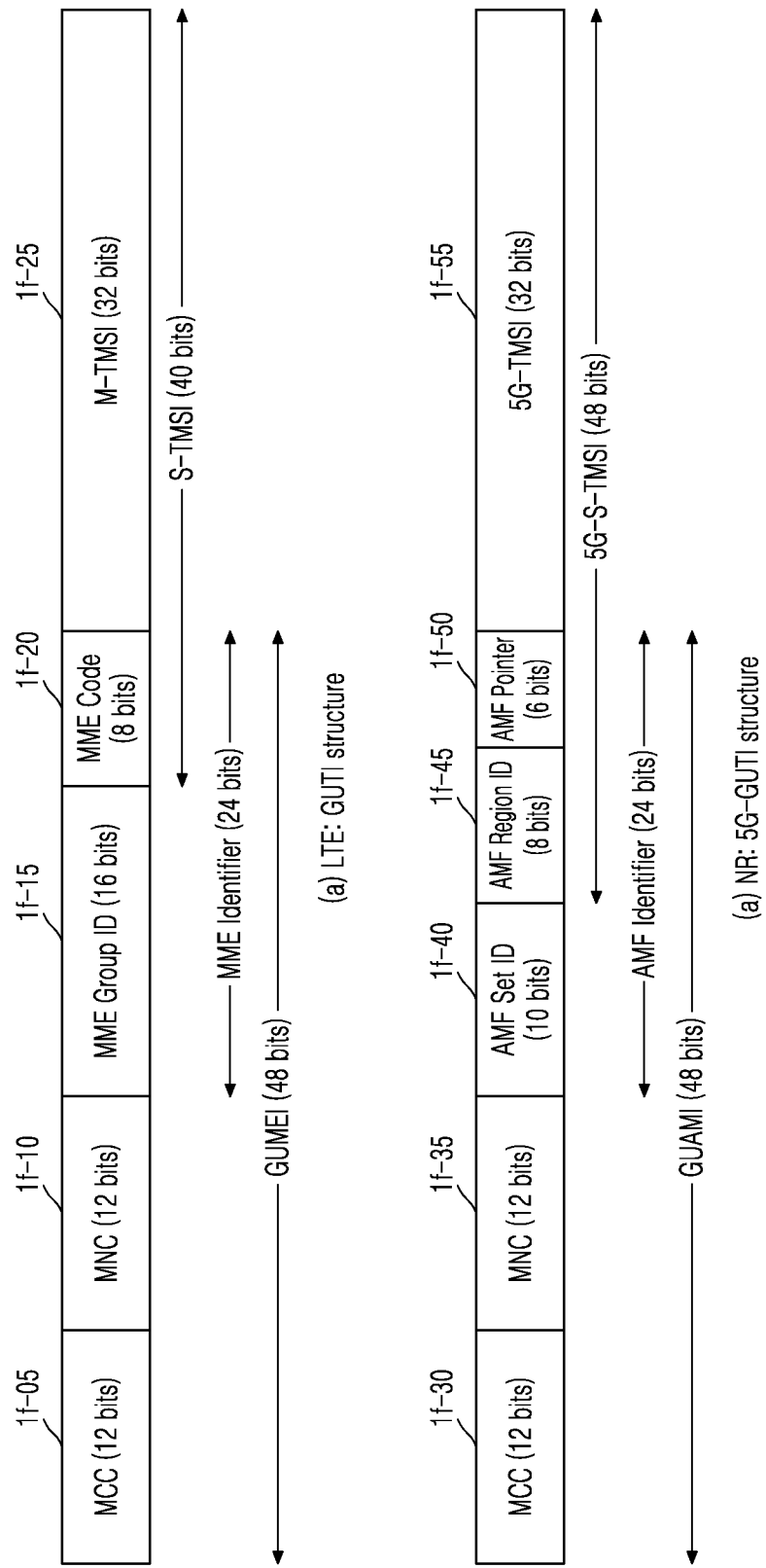
FIG. 6 illustrates a view for describing a structure of a network unique identifier of each of an LTE system and a next-generation mobile communication system to which an embodiment of the disclosure is applied.

FIG. 6 illustrates a view for describing a structure of a network unique identifier of each of an LTE system and a next-generation mobile communication system to which an embodiment of the disclosure is applied.

In a next-generation mobile communication system, to distinguish and manage more wireless communication devices and support network connection in an LTE system, a UE unique identifier in a network may be introduced as an identifier having a space that is equal to or larger than that of a unique identifier in the LTE system. In particular, in a network, unique identifiers, a 5G-globally unique temporary UE identity (GUTI) and a 5G-SAE temporary mobile subscriber identity (5G-S-TMSI) may be set different from a GUTI and an S-TMSI of an LTE system.

First, FIG. 6 illustrates a structure of a GUTI [80 bits] in an LTE system. Referring to FIG. 6, in an LTE system, a structure of a GUTI [80 bits] may include a mobile country code (MCC) [12 bits] 1f-05, a mobile network code (MNC) [12 bits] 1f-10, MME identifiers [24 bits] 1f-15 and 1f-20, and an MME TMSI [32 bits] 1f-25. That is, in the LTE system, a GUTI may be expressed as a sum of a network identifier of an MME existing per network operator in one country and a UE identifier uniquely assigned in the MME, i.e., an M-TMSI. Herein, an MME identifier may include an MME group ID [16 bits] 1f-15 and an MME code [8 bits] 1f-20, and a globally unique MME identifier (GUMMEI) [48 bits] may include an MCC, an MNC, and an MME identifier. An EPC of the LTE system may assign a GUTI distinguishable by the LTE system to an initially accessing UE. An identifier distinguishable by an LTE eNB access stratum, i.e., an S-TMSI [40 bits] may be configured as a part of a GUTI for use. Herein, the S-TMSI may include an MME code 1f-20 and an M-TMSI 1f-25.

In a 5G or NR system, a length of a unique identifier owned by a UE is globally maintained, while a length of an identifier owned by the UE in the network, i.e., distinguishable in a 5G or NR eNBs access stratum, a 5G-S-TMSI is increased, thus increasing the number of UEs accessible in the network.

FIG. 6 illustrates a structure of a 5G-GUTI [80 bits] in a 5G or NR system. Referring to FIG. 6, in a 5G or NR system, a structure of a 5G-GUTI [80 bits] may include an MCC [12 bits] 1f-30, an MNC [12 bits] 1f-35, AMF identifiers [24 bits] 1f-40, 1f-45, and 1f-50, and a 5G-TMSI [32 bits] 1f-55. That is, in the 5G or NR system, a 5G-GUTI may be expressed as a sum of a network identifier of an AMF existing per network operator in one country and a UE identifier uniquely assigned in the AMF, i.e., an 5G-TMSI. Herein, an AMF identifier may include an AMF set ID [10 bits] 1f-40, an AMF region ID [8 bits] 1f-45, and an AMF pointer [6 bits] 1f-50, and a globally unique AMF identifier (GUAMI) [48 bits] may include an MCC, an MNC, and an AMF identifier. A 5G or NR CN of the 5G or NR system may assign a GUTI distinguishable by the NR system to an initially accessing UE. An identifier distinguishable by an NR eNB access stratum, i.e., an 5G-S-TMSI [48 bits] may be configured as a part of a GUTI for use. Herein, the 5G-S-TMSI may include an AMF region ID 1f-45, an AMF pointer 1f-50, and a 5G-TMSI 1f-55.

As shown in FIG. 6, a 5G or NR system may configure a 5G-S-TMSI of 48 bits, which is increased by 8 bits from in the LTE system, and assign the 48-bit 5G-S-TMSI to the UE, in which case a determination is made as to whether a size of a message 3 (msg 3, Message 3) carrying the 5G-S-TMSI is sufficient. Examples of the message 3 may include an RRC setup request, an RRC resume request, an RRC reestablishment request, etc. In the LTE system, the message 3 of 56 bits is used, and in the 5G or NR system, a minimum uplink grant size is 56 bits without being changed. The message 3 is a request message attempting connection to a network, necessitating good link performance in a cell coverage. A smaller size of a packet transmitted by the UE expands a UE coverage, such that assignment of an uplink grant of 56 bits or more may cause degraded cell access coverage performance. As a result, in the 5G or NR system, to distinguish an uplink grant of 56 bits and an uplink grant of 56 bits or more (e.g., 72 bit) for common control channel (CCCH) transmission from each other, a separate logical channel identifier (LCID) is further assigned to a MAC header. However, when the 56-bit uplink grant is assigned, the 5G-S-TMSI increased by 8 bits from the S-TMSI of the LTE may not be entirely carried in the message 3, such that a part of the 5G-S-TMSI may be transmitted in the message 3 and the other part may be transmitted in a message 5 (msg 5, message 5). For example, 39 bits of the 5G-S-TMSI assigned from the network may be delivered through the message 3 and the other 9 bits may be delivered through the message 5. The message 3 may be an RRC setup request message, and the message 5 may be an RRC setup complete message.

In the 56-bit uplink grant, a MAC PDU including a MAC PDU header [8 bits] and a CCCH [48 bits] may be delivered. Herein, the CCCH message may be the message 3, and for example, when the RRC setup request message is used, 2 bits for identifying the RRC setup request message among types of uplink CCCH messages are used, and 1 bit in a CHOICE structure for future extension is used.

```
UL-CCCH-Message ::= SEQUENCE {
    message                 UL-CCCH-MessageType
}
UL-CCCH-MessageType ::= CHOICE {
    c1                      CHOICE {
        rrcSetupRequest             RRCSetupRequest,
        rrcResumeRequest            RRCResumeRequest,
        rrcReestablishmentRequest   RRCReestablishmentRequest,
        rrcSystemInfoRequest        RRCSystemInfoRequest
    },
    messageClassExtension   SEQUENCE { }
}
```

In addition, 2 bits of a CHOICE structure for distinguishing three types of UE identities of the RRC setup request message and least significant bit (LSB) information of the 5G-S-TMSI of a maximum of 39 bits (39 bits from the right of total bits) are used. Moreover, 4 bits for identifying a maximum of 16 establishment cause are used.

```
RRCSetupRequest ::=     SEQUENCE {
    rrcSetupRequest                 RRCSetupRequest-IEs
}
RRCSetupRequest-IEs ::= SEQUENCE {
    ue-Identity             InitialUE-Identity,
    establishmentCause      EstablishmentCause
}
InitialUE-Identity ::=  CHOICE {
    ng-5g-s-tmsi-part1          BIT STRING (SIZE (39)),
    randomValue                 BIT STRING (SIZE (39)),
    spare                       BIT STRING (SIZE (1))
}
-- FFS Which additional cause values are supported: delayTolerantAccess, MO videop, MO SMS, etc.
EstablishmentCause ::=          ENUMERATED {
                    emergency, highPriorityAccess, mt-Access, mo-Signalling,
                    mo-Data, mo-VoiceCall,spare1, spare2, spare3,spare4,
                    spare5, spare6, spare7, spare8, spare9, spare10}
```

That is, the 56-bit uplink grant includes the following information:
MAC header [8 bits]
[3 bits] for identifying an uplink CCCH message
RRCSetupReqeust [45 bits] {(ue-Identity: [2 bits]+[39 bits])+(cause value: [4 bits])}

The message 5 may include most significant bit (MSB) information (9 bits from the left of the total bits) of the 9-bit 5G-S-TMSI. For example, the RRC connection complete message may be configured as below.

Hereinbelow, a description will be made of a method of attempting to connect to a network by carrying a 5G-S-TMSI that is a UE's identifier in a distributed manner through the message 3 and the message 5.

In an embodiment of the disclosure, when the UE attempts to connect to the network, a 39-bit part of the 5G-S-TMSI may be transmitted through the RRC setup request message. When there is 5G-S-TMSI information assigned from the network, 39-bit LSBs of the 5G-S-TMSI information may be included, but when there is no 5G-S-TMSI information assigned from the network, a 39-bit random value may be produced and included in the message 3 to attempt to access the network. Thereafter, the UE may receive an RRC setup message that is a message 4 (msg 4, Message 4) from the network, and the UE having received the message may perform a procedure for a connection to an eNB by using the entire 5G-S-TMSI or 9-bit MSBs of the 5G-S-TMSI based on a state of the UE.

However, in the 5G or NR system, in addition to an operation based on the above-described RRC setup procedure, the UE having sent an RRC resume request and an RRC reestablishment request may receive an RRC setup (Message 4) from an eNB in response to a request for the message 3. The operation corresponding to this case will be described in detail. That is, a description will be made of how to deliver the 5G-S-TMSI by using the message 5 in a particular case.

```
RRCSetupComplete ::=    SEQUENCE {
    rrc-TransactionIdentifier   RRC-TransactionIdentifier,
    criticalExtensions          CHOICE {
        c1                          CHOICE{
            rrcSetupComplete        RRCSetupComplete-IEs,
            spare3 NULL, spare2 NULL, spare1 NULL
        },
        criticalExtensionsFuture    SEQUENCE { }
    }
}
RRCSetupComplete-IEs ::= SEQUENCE {
    selectedPLBN-Identity   INTEGER (1..maxPLMN),
    registeredAMF           RegisteredAMF                                       OPTIONAL,
    guami-Type              ENUMERATED (native, mapped)                         OPTIDNAL,
    s-nssai-list            SEQUENCE (SIZE (1..maxNrofS-NSSAI)) OF S-NSSAI      OPTIONAL,
    dedicatedInfoNAS        DedicatedInfoNAS,
    ng-5G-S-TMSI-Value      CHOICE {
        ng-5g-s-tmsi            NG-5G-S-TMSI,
        ng-5g-s-tmsi-part2      BIT STRING (SIZE (9))
    }                                                                           OPTIONAL,
```

Figure 7:
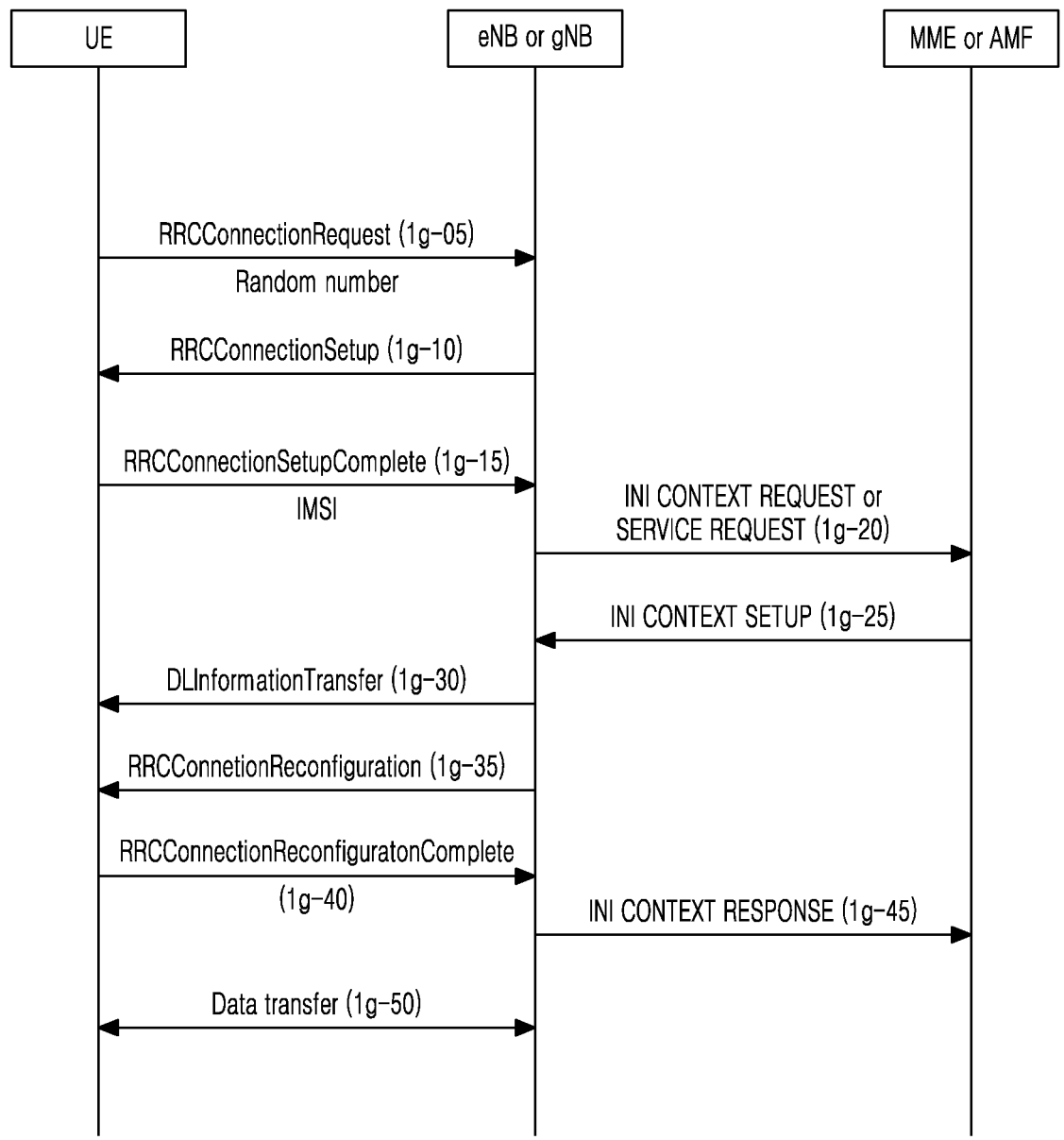
FIG. 7 illustrates a ladder diagram describing operations in which user equipment (UE) attempting to initially access a network is assigned a unique identifier from a network and configures a connection with a network, according to an embodiment of the disclosure.

FIG. 7 illustrates a ladder diagram describing operations in which a UE attempting to initially access a network is assigned a unique identifier from a network and configures a connection with a network, according to an embodiment of the disclosure.

A UE initially attempting to access a network may mean a UE which has not ever performed registration in an LTE system and a 5G or NR system before. That is, the initially attempting UE may mean a UE that has not been assigned with a first unique identifier (GUTI) or a second unique identifier (5G-GUTI) from the LTE system or the 5G or NR system.

Referring to FIG. 7, a UE in an RRC idle mode, when initially accessing the network, may start a search for a cell, perform cell selection/reselection to find a suitable cell, and camp on the found cell. The UE may be synchronized with the camping-on cell and perform a random access procedure. In the random access procedure, when the UE transmits a message 3 (e.g., 56 bits (8 bits of a MAC header and 48 bits of a CCCH SDU) through a CCCH, the UE may transmit random values having a specific length (e.g., 40 bits or 39 bits) through the message 3 (CCCH SDU) in operation 1g-05.

The eNB or gNB having received the message 3 (CCCH SDU) may identically copy the first 6 bytes of the received message 3 (CCCH SDU) for contention resolution, include the copied first 6 bytes in MAC control information (MAC control element, contention resolution MAC CE), and transmit the same to the UE through a message 4 in operation 1g-10. The UE having received the message 4 may identify contention resolution and transmit a message 5 to the eNB or gNB in operation 1g-15. Herein, the UE may carry a UE-unique identifier (e.g., an IMSI) to the network through an NAS container (dedicatedInfoNAS) of the message 5, such that the network may identify the UE-unique identifier and register the UE in the network.

Thereafter, the eNB or gNB may receive the message 5 and identify network information in the message 5, thus routing the messages from the UE to a CN (MME or AMF). The eNB or gNB may also transmit NAS container information included in the message 5 to the CN (the EPC or the 5G or NR CN) through an NAS message (e.g., an INITIAL CONTEXT REQUEST or SERVICE REQUEST) in operation 1g-20. The CN may identify the unique identifier of the UE, register the UE in the CN, determine to assign a unique identifier (GUTI/5G-TMSI or S-TMSI/5G-S-TMSI) for identifying the UE in a network system (the LTE system or the 5G or NR system), and transmit the assigned unique identifier to the eNB or gNB through an NAS message (e.g., INITIAL CONTEXT SETUP) to deliver the assigned unique identifier to the UE in operation 1g-25. The eNB or gNB may deliver the message to the UE in operation 1g-30. When the UE is registered in the LTE system through the received message, the UE may identify a first unique identifier (GUTI), and when the UE is registered in the 5G or NR system, the UE may identify a second unique identifier (5G-GUTI) and store the same in an NAS layer device in operation 1g-30. When the eNB or gNB transmits an RRC Connection Reconfiguration message to configure RRC connection, the UE may receive the RRC Connection Reconfiguration message in operation 1g-35 and complete configuration by receiving each bearer configuration information. Thereafter, the UE may transmit an RRC Connection Reconfiguration Complete message to the eNB or gNB to complete connection configuration in operation 1g-40. The eNB or gNB may complete connection configuration with the UE and transmit a response indicating completion of initial connection and context configuration to the CN in operation 1g-45. The UE may complete connection configuration with the network and thus be able to exchange data with the network in operation 1g-50.

Figure 8:
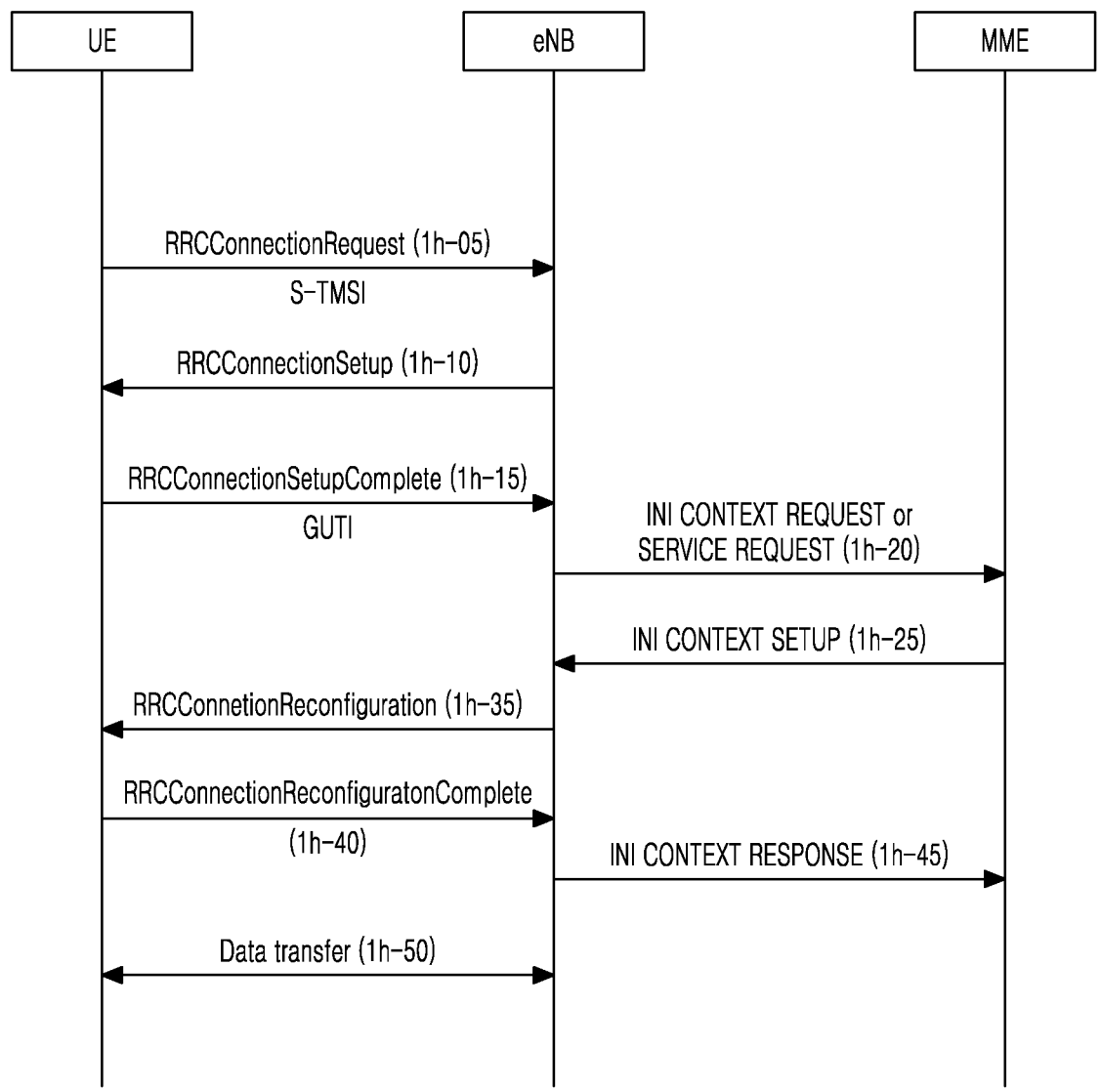
FIG. 8 illustrates a ladder diagram describing a method, performed by a UE assigned a first unique identifier from an LTE system, of configuring a connection to a network, according to an embodiment of the disclosure.

FIG. 8 illustrates a ladder diagram describing a method, performed by a UE assigned a first unique identifier from an LTE system, of configuring a connection to a network, according to an embodiment of the disclosure.

The UE assigned with the first unique identifier (GUTI) from the LTE system may mean a UE that has registered in the LTE system and thus stored the first unique identifier (GUTI) therein.

Referring to FIG. 8, the UE in the RRC idle mode may re-attempt to connect to a network when the UE receives a paging message or needs to update a tracking area or to transmit data in an uplink. The UE may start a search for a cell, perform cell selection/reselection to find a suitable cell, and camp on the found cell. The UE may be synchronized with the camping-on cell and perform a random access procedure. In the random access procedure, when the UE transmits a message 3 (e.g., 56 bits (8 bits of an MAC header and 48 bits of a CCCH SDU) through a CCCH, to perform contention resolution among UEs, the eNB may define a part of the first unique identifier (GUTI) previously assigned from the LTE system, instead of the random values, as a first identifier (e.g., the S-TMSI) for identifying the UE among eNBs, and transmit the first identifier through the message 3. That is, LSBs (e.g., 40 LSBs) of the first unique identifier (e.g., the GUTI) stored in the UE may be transmitted as the first identifier (e.g., the S-TMSI) through the message 3 (CCCH SDU) in operation 1h-05.

In the message 3, an indicator may be defined and included, which indicates whether a value corresponding to the identifier included in the message 3 is the 40-bit random value described in FIG. 7 or the first identifier (S-TMSI) to allow the eNB to distinguish the random value and the first identifier from each other. For example, a 1-bit indicator may be used to indicate the random value or the first identifier. The eNB or gNB having received the message 3 may identically copy the first 6 bytes of the received message 3 (CCCH SDU) for contention resolution, include the copied first 6 bytes (48 bits) in MAC control information (MAC control element, contention resolution MAC CE), and transmit the same to the UE through a message 4 in operation 1h-10. The UE having received the message 4 may identify contention resolution and transmit the message 5 to the eNB or gNB in operation 1h-15. Herein, the UE may carry the first unique identifier (e.g., the GUTI) assigned from the LTE system and stored, to the network through an NAS container (dedicatedInfoNAS) of the message 5, such that the network may identify the first unique identifier and the UE.

Thereafter, the eNB may identify the first identifier (S-TMSI) and receive the message 5. The eNB may identify network information in the message 5, thus routing the messages from the UE to a CN (MME). The eNB may also transmit NAS container information included in the message 5 to the CN (the EPC or the 5G or NR CN) through an NAS message (e.g., an INITIAL CONTEXT REQUEST or SERVICE REQUEST) in operation 1h-20. The eNB may identify the first identifier, and may transmit a SERVICE REQUEST message to the CN when the eNB determines that the UE is a registered UE and the UE re-connects and requests a service. The CN may identify the UE's unique identifier, that is, the network system (LTE system or 5G or NR system) identifies the UE and a context, and transmit the first unique identifier (e.g., the IMSI) to the eNB through the NAS (e.g., INITIAL CONTEXT SETUP) message to allow UE's connection in operation 1h-25. The eNB may transmit the received NAS message to the UE. When the eNB transmits an RRC Connection Reconfiguration message to configure RRC connection in operation 1h-35, the UE may receive the RRC Connection Reconfiguration message in operation and complete configuration by receiving each bearer configuration information in operation 1h-35. Thereafter, the UE may transmit an RRC Connection Reconfiguration Complete message to the eNB or gNB to complete connection configuration in operation 1h-40. The eNB may complete connection configuration with the UE and transmit a response indicating completion of initial connection and context configuration to the CN in operation 1h-45. The UE may complete connection configuration with the network and thus be able to exchange data with the network in operation 1h-50.

Figure 9:
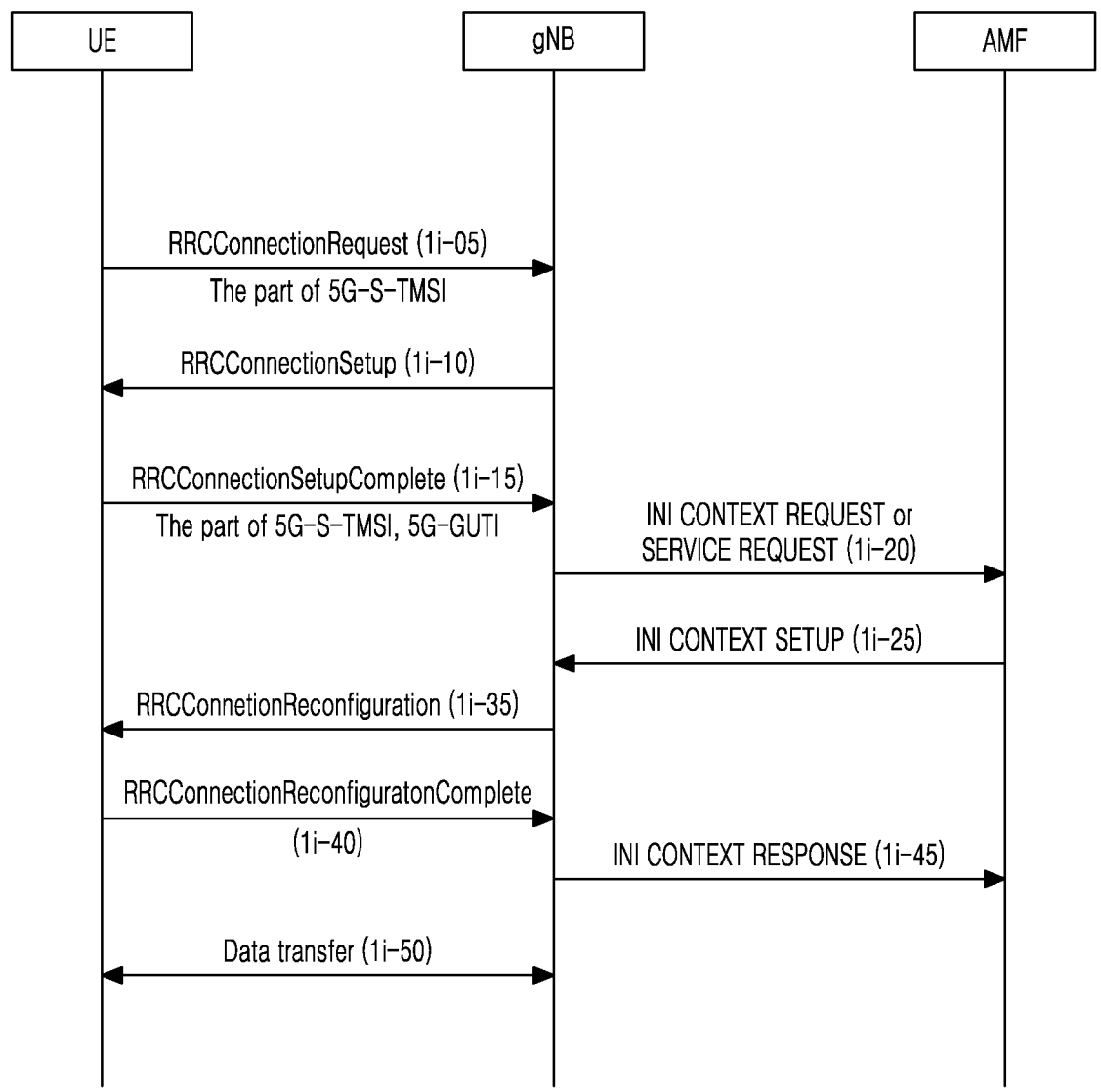
FIG. 9 illustrates a ladder diagram describing a method, performed by a UE assigned a second unique identifier from an NR system, of configuring a connection to a network, according to an embodiment of the disclosure.

FIG. 9 illustrates a ladder diagram describing a method, performed by a UE assigned a second unique identifier from an NR system, of configuring a connection to a network, according to an embodiment of the disclosure.

The UE assigned with the second unique identifier (5G-GUTI) from the 5G or NR system may mean a UE that has registered in the 5G or NR system and thus stored the second unique identifier (5G-GUTI) therein.

To identify and manage more wireless communication devices and support connection to a network, a next-generation mobile communication system may introduce the second unique identifier (5G-GUTI) as an identifier having a larger space than the first unique identifier (GUTI), and a second identifier (e.g., a 48-bit 5G-S-TMSI) as an identifier having a larger space than the first identifier (e.g., a 40-bit S-TMSI).

In an embodiment of the disclosure, the message 3 may be transmitted through the CCCH and is a key message used for the UE to configure connection to the network, such that a coverage may be a key issue. The coverage may be expanded when as small data as possible is transmitted, and thus in an embodiment of the disclosure, the size of the message 3 may be limited to the size of a minimum transport block to maximize the coverage. For example, the message 3 may have a size of 56 bits. However, the second unique identifier (5G-GUTI) having a larger or equal space may be introduced, such that the second identifier having the larger or equal space may be used when the UE access the network. That is, the size of the minimum transport block may be insufficient to include the new second identifier. Thus, when the UE attempts to access the network by using the second identifier having the larger space, the UE may use the indicator of the message 3 to indicate that a part of the second identifier is to be transmitted through the message 3 and the other part of the second identifier is to be transmitted through the message 5, such that the eNB may normally receive the second identifier having the larger space.

Referring to FIG. 9, the UE in the RRC idle mode may re-attempt to connect to a network when the UE receives a paging message or needs to update a tracking area or to transmit data in an uplink. The UE may start a search for a cell, perform cell selection/reselection to find a suitable cell, and camp on the found cell. The UE may be synchronized with the camping-on cell and perform a random access procedure. In the random access procedure, when the UE transmits a message 3 (e.g., 56 bits (8 bits of an MAC header and 48 bits of a CCCH SDU) through a CCCH, to perform contention resolution among UEs, the eNB may define a part of the second unique identifier previously assigned from the 5G or NR system, instead of the random values, as a second identifier (e.g., the 5G-S-TMSI) for identifying the UE among eNBs, and transmit the first identifier through the message 3. However, the size of the second identifier (5G-S-TMSI) may be large, e.g., 48 bits, and thus the UE may transmit the second identifier to the eNB in a distributed manner through the message 3 and the message 5. That is, LSBs (e.g., 39 LSBs) of the second unique identifier (e.g., the 5G-S-TMSI) stored in the UE may be transmitted through the message 3 (CCCH SDU) in operation 1i-05.

In the message 3, an indicator may be defined and included, which indicates whether a value corresponding to the identifier included in the message 3 is the random value or the second identifier to allow the eNB to identify a part of the second identifier. For such identification, a 2-bit identifier may be used also for future extra expansion. The eNB or gNB having received the message 3 may identically copy the first 6 bytes of the received message 3 (CCCH SDU) for contention resolution, include the copied first 6 bytes (48 bits) in MAC control information (MAC control element, contention resolution MAC CE), and transmit the same to the UE through a message 4 in operation 1i-10. The UE having received the message 4 may identify contention resolution and transmit the message 5 to the eNB or gNB in operation 1i-15. Herein, the UE may transmit through the message 5, a part (e.g., 9 MSBs) of the second identifier other than the part of the second identifier transmitted through the message 3. The UE may carry the second unique identifier (e.g., the 5G-GUTI) assigned from the 5G or NR system and stored, to the network through an NAS container (dedicatedInfoNAS) of the message 5, such that the network may identify the second unique identifier and the UE.

Thereafter, the eNB may identify the second identifier (5G-S-TMSI) included in the message 3 and the message 5 in the distributed manner, and identify network information in the message 5, thus routing the messages from the UE to a CN (AMF). The eNB may also transmit NAS container information included in the message 5 to the CN (the EPC or the 5G or NR CN) through an NAS message (e.g., an INITIAL CONTEXT REQUEST or SERVICE REQUEST) in operation 1i-20. The eNB may identify the second identifier, and may transmit a SERVICE REQUEST message to the CN when the eNB determines that the UE is a registered UE and the UE re-connects and requests a service. The CN may identify the UE's unique identifier, that is, the network system (LTE system or 5G or NR system) identifies the UE and a context, and transmit the second unique identifier (e.g., the IMSI) to the eNB through the NAS (e.g., INITIAL CONTEXT SETUP) message to allow UE's connection in operation 1i-25. The eNB may transmit the received NAS message to the UE. When the eNB transmits an RRC Connection Reconfiguration message to configure RRC connection in operation 1i-35, the UE may receive the RRC Connection Reconfiguration message in operation and complete configuration by receiving each bearer configuration information in operation 1i-35. Thereafter, the UE may transmit an RRC Connection Reconfiguration Complete message to the eNB or gNB to complete connection configuration in operation 1i-40. The eNB may complete connection configuration with the UE and transmit a response indicating completion of initial connection and context configuration to the CN in operation 1i-45. The UE may complete connection configuration with the network and thus be able to exchange data with the network in operation 1i-50.

While a description has been made with reference to FIGS. 8 and 9 regarding a general operation after the UE is provided with the second identifier (5G-S-TMSI) from upper layers (the NSA and the CN), transmits the RRC Setup Request message (message 3), and receives the RRC Setup message through the message 4 in the 5G or NR system, the UE may also receive the RRC Setup message (message 4) as a fallback case in the 5G or NR system. The fallback case corresponds to a case where when the UE transmits an RRC Reestablishment Request message or an RRC Resume Request message, the eNB delivers an RRC Setup message to instruct the UE to re-establish RRC connection. Also in the fallback case, the UE may deliver the RRC Setup Complete message through the message 5 because the UE has received the RRC Setup message through the message 4. When the UE receives the RRC Setup message in response to the RRC Reestablishment Request message or the RRC Resume Request message, the UE may not be provided with the second identifier (5G-S-TMSI) from the upper layer in an initialization process of a procedure (RRC Reestablishment or RRC Resume) for a request, and the RRC Setup Complete message of the message 5 may include the entire second identifier (5G-S-TMSI) rather than 9 MSBs of the second identifier (5G-S-TMSI). This case corresponds to a case where the message 5 includes the effective second identifier (5G-S-TMSI) provided from the upper layer by the UE prior to an RRC Reestablishment or RRC Resume procedure, and 39 LSBs of the second identifier (5G-S-TMSI) are not delivered in a distributed manner in the message 3 (RRC Reestablishment Request or RRC Resume Request message) of the procedure, such that the message 5 (RRC Setup Complete message) includes the entire second identifier (5G-S-TMSI). Table 1 shows a case where the second identifier (5G-S-TMSI) is included in the message 3 and the message 5.

TABLE 1

| Case | Whether 5G-S-TMSI is provided by upper layer in initialization of procedure | 5G-S-TMSI value included in RRCSetupComplete message |
|---|---|---|
| Case 1. When RRC Setup message is triggered by RRCSetupRequest message including 39 LSBs of 5G-S-TMSI as UE-identity | Provided | Including 9 MSBs of 5G-S-TMSI (set ng-5G-S-TMSI-Value to ng-5G-s-tmsi-part2) |
| Case 2. When RRC Setup message is triggered by RRCSetupRequest message including 39-bit random value as UE-identity | Not Provided | Not including 5G-S-TMSI information |
| Case 3. When RRC Setup message is triggered by RRCReestablish-mentRequest message | Not Provided (or Not Sure) | Including total 48 bits of 5G-S-TMSI (set ng-5G-S-TMSI-Value to NG-5G-S-TMSI) |
| Case 4. When RRC Setup message is triggered by RRCResumeRequest message | Not Provided (or Not Sure) | Including total 48 bits of 5G-S-TMSI (set ng-5G-S-TMSI-Value to NG-5G-S-TMSI) |

Hereinbelow, a description will be made of a method, performed by a UE having received an RRCSetup message, of including 5G-S-TMSI information provided from an upper layer in the message 5 (RRCSetupComplete message) according to existence or absence of the 5G-S-TMSI information, including the above-described fallback case.

Figure 10:
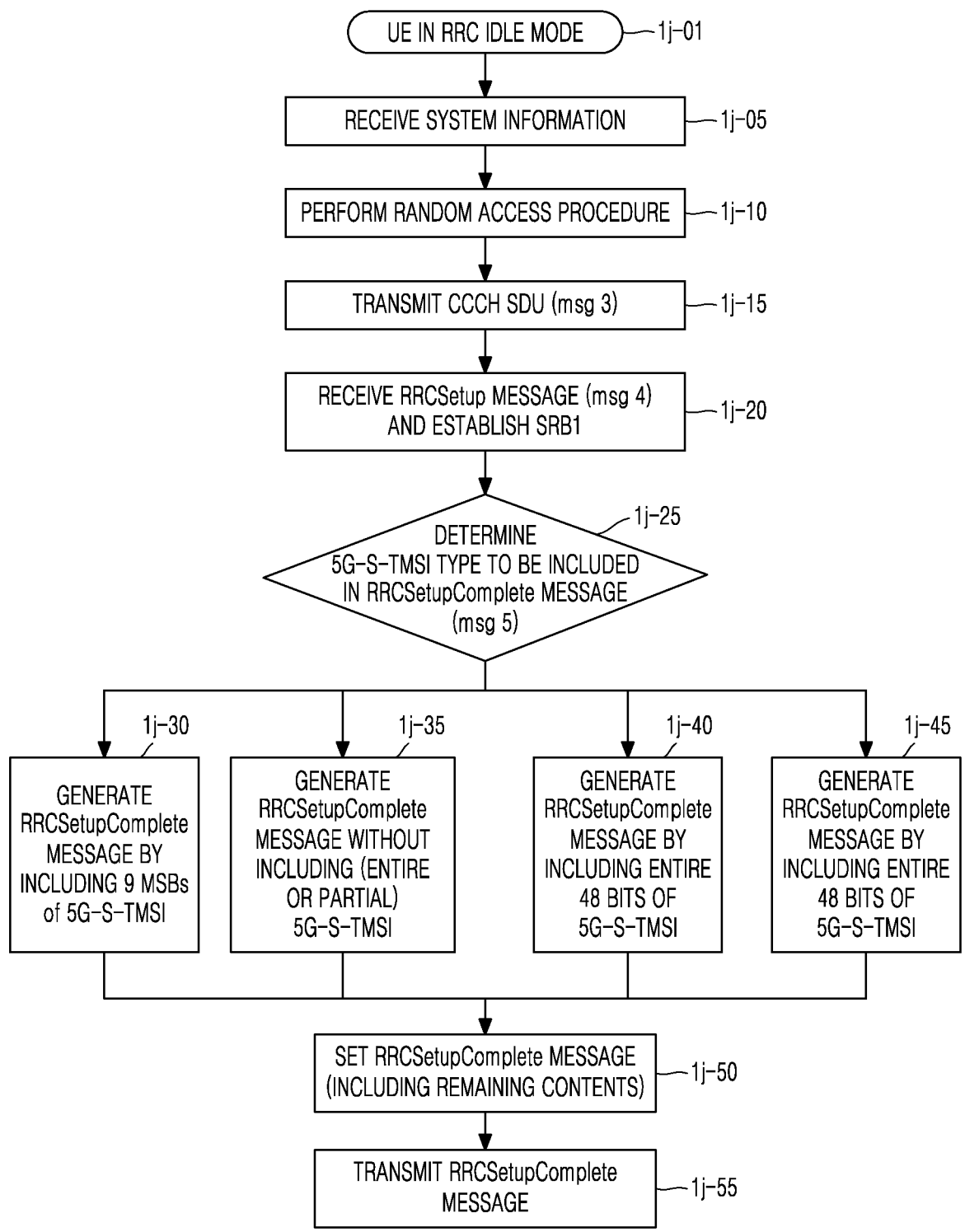
FIG. 10 illustrates a flowchart of a method, performed by a UE having received an RRCSetup message, of including 5G-S-TMSI information provided from an upper layer in an RRCSetupComplete message according to existence or absence of the 5G-S-TMSI information, according to an embodiment of the disclosure.

FIG. 10 illustrates a flowchart of a method, performed by a UE having received an RRCSetup message, of including 5G-S-TMSI information provided from an upper layer in an RRCSetupComplete message according to existence or absence of the 5G-S-TMSI information, according to an embodiment of the disclosure.

Referring to FIG. 10, the UE in the RRC idle mode may re-attempt to access a network when the UE receives a paging message or needs to update a tracking area or to transmit data in an uplink. The UE may start a search for a cell, perform cell selection/reselection to find a suitable cell, camp on the found cell, and receive system information from the eNB. The UE may be synchronized with the camping-on cell and perform a random access procedure in operation 1*j*-10. In the random access procedure, the UE may transmit the message 3 through the CCCH. Through transmission of the message 3, the following RRC message may be configured and transmitted based on a current state of the UE and a purpose of a request with respect to a network.

RRCSetupRequest: When the UE initially accesses the network or newly requests connection due to disconnection in spite of connection to the eNB (message configuration may differ according to a case where the 5G-S-TMSI is provided from an upper layer and a case where the 5G-S-TMSI is not provided from an upper layer)

RRCResumRequest: When the UE having connected to the network transits to an inactive state for a particular reason, but requests connection to the network for reasons such as generation of data, RAN area update, etc.

RRCReestablishmentRequest: When the UE connects to the network and link connection is released for a particular reason (e.g., a radio link failure), but the UE requests an attempt to the eNB The above-described UE operation indicates a UE operation prior to a general RRCSetupRequest procedure, but operation 1*j*-15 includes the entire procedure for transmitting RRCResumeRequest and RRCResumeRequest. That is, an operation at 1*j*-15 may differ with a status of the UE. In operation 1*j*-20, the UE may receive the RRCSetup message from the eNB through the message 4 and establishes SRB1. As discussed above, the RRC Setup message may be configured by the eNB regardless of a type of a message requested by the UE, and in view of the UE, an operation may vary with a message request, in response to which the RRCSetup message is received. In operation 1*j*-25, the UE may determine a method for including the 5G-S-TMSI in the RRCSetupComplete message according to the message 3 (RRCSetupRequest, RRCResumeRequest, or RRCReestablishmentRequest), in response to which the RRCSetup message received in operation 1*j*-20 is triggered.

When the UE corresponds to Case 1 of Table 1 (the RRC Setup message is triggered by the RRCSetupRequest message including the 39 LSBs of the 5G-S-TMSI as the UE-identity) in operation 1*j*-25, the UE is provided with the 5G-S-TMSI from an upper layer before transmission of the message 3 (RRCSetupRequest), such that the 39 LSBs of the 5G-S-TMSI are included in the message 3, and thus the UE may generate the RRCSetupComplete message including the other 9 MSBs of the 5G-S-TMSI in operation 1*j*-30.

When the UE corresponds to Case 2 of Table 1 (the RRC Setup message is triggered by the RRCSetupRequest message including a random value of 39 bits as the UE-identity) in operation 1*j*-25, the UE is not provided with the 5G-S-TMSI from an upper layer before transmission of the message 3 (RRCSetupRequest), such that the random value instead of the 5G-S-TMSI is included in the message 3, and thus the UE may generate the RRCSetupComplete message without including information about the 5G-S-TMSI in operation 1*j*-35. That is, none of the entire information and partial information of the 5G-S-TMSI is included in the message 5.

When the UE corresponds to Case 3 of Table 1 (the RRC Setup message is triggered by the RRCReestablishmentRequest message) in operation 1*j*-25, the UE is not provided with the 5G-S-TMSI from an upper layer at the time of transmission of the message 3 (RRCReestablishmentRequest) and a valid 5G-S-TMSI received from the upper layer at the time of previous connection with the network is stored, such that information related to the 5G-S-TMSI is not included in the message 3 (RRCReestablishmentRequest), and thus the UE may generate the RRCSetupComplete message including the entire 48-bit 5G-S-TMSI in operation 1*j*-40.

When the UE corresponds to Case 4 of Table 1 (the RRC Setup message is triggered by the RRCResumeRequest message) in operation 1*j*-25, the UE is not provided with the 5G-S from an upper layer at the time of transmission of the message 4 (RRCResumeRequest) and a valid 5G-S-TMSI received from the upper layer at the time of previous connection with the network is stored, such that information related to the 5G-S-TMSI is not included in the message 3 (RRCResumeRequest), and thus the UE may generate the RRCSetupComplete message including the entire 48-bit 5G-S-TMSI in operation 1*j*-45.

After a UE operation per case is performed, the UE may set the message 5 (RRCSetupComplete) by including the other contents than the 5G-S-TMSI in operation 1*j*-50. In operation 1*j*-55, the UE may transmit the RRCSetupComplete message generated in operation 1*j*-50 to the eNB.

UE operations described with reference to FIG. 10 may be expressed as below in the standards.

Camping on a cell
Receiving MIB and SIB 1
Triggering random access procedure
Transmitting CCCH SDU in the Msg 3
Receiving RRCSetupRequest and establish SRB1
Determine the type ng-5g-s-tmsi to be included in RRC-SetupComplete message and set the contents as below:
1> set the content of RRCSetupComplete message as follows:
2> if upper layers provide an 5G-S-TMSI and RRCSetup is received in response to an RRCSetupRequest:
3> Include ng-5G-s-tmsi-part2 in RRCSetupComplete message
3> set the ng-5g-s-tmsi-bits to ng-5G-s-tmsi-part2;
2> else if the RRCSetup is received in response to an RRCReestablishmentRequest or RRCResumeRequest: (or higher layer have provided valid ng-5G-s-tmsi and UE have stored it)
3> Include ng-5G-s-tmsi in RRCSetupComplete message
3> set the ng-5g-s-tmsi-bits set to ng-5g-s-tmsi;
2> else if the RRCSetup is received in response to RRCSetup and upper layer does not provide an 5G-S-TMSI:
3> do not include ng-5G-s-tmsi-part2 nor ng-5g-s-tmsi in the RRCSetupComplete message
Setting the other contents of RRCSetupComplete
Transmitting RRCSetupComplete message FIG. 11 illustrates a block diagram of a structure of a UE according to an embodiment of the disclosure.

Figure 11:
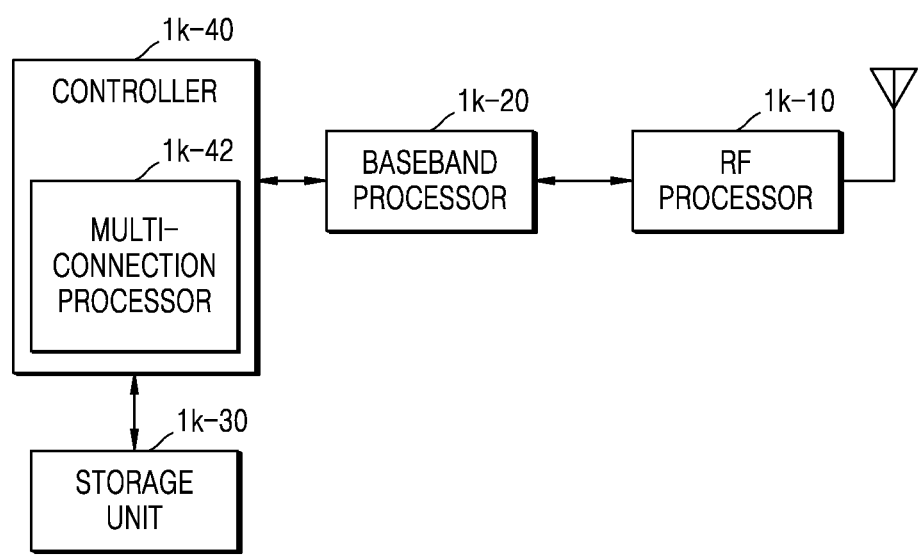
FIG. 11 illustrates a block diagram of a structure of a UE according to an embodiment of the disclosure.

Referring to FIG. 11, the UE may include a radio frequency (RF) processor 1*k*-10, a baseband processor 1*k*-20, a storage unit 1*k*-30, and a controller 1*k*-40.

The RF processor 1*k*-10 may perform a function for transmitting and receiving a signal through a wireless channel, such as band translation, amplification, and so forth. That is, the RF processor 1*k*-10 up-converts a baseband signal provided from the baseband processor 1*k*-20 into an RF band signal, transmits the RF band signal through an antenna, and down-converts an RF band signal received through the antenna into a baseband signal. For example, the RF processor 1*k*-10 may include a transmission filter, a reception filter, an amplifier, a mixer, an oscillator, a digital-to-analog converter (DAC), an analog-to-digital converter (ADC), and so forth. Although one antenna is illustrated in FIG. 11, the UE may also include multiple antennas. The RF processor 1*k*-10 may include multiple RF chains. The RF processor 1*k*-10 may perform beamforming. For the beamforming, the RF processor 1*k*-10 may adjust phases and magnitudes of signals transmitted and received through multiple antennas or antenna elements. The RF processor 1*k*-10 may also perform MIMO and may receive several layers when performing MIMO operations.

The baseband processor 1*k*-20 performs conversion between a baseband signal and a bitstream according to physical layer standards of a system. For example, in data transmission, the baseband processor 1*k*-20 may generate complex symbols by encoding and modulating a transmission bitstream. In data reception, the baseband processor 1*k*-20 may recover a received bitstream by demodulating and decoding the baseband signal provided from the RF processor 1*k*-10. For example, when orthogonal frequency division multiplexing (OFDM) is used, in data transmission, the baseband processor 1*k*-20 may generate complex symbols by encoding and modulating a transmission bitstream, map the complex symbols to subcarriers, and construct OFDM symbols through inverse fast Fourier transform (IFFT) and cyclic prefix (CP) insertion. Also, in data reception, the baseband processor 1*k*-20 divides the baseband signal provided from the RF processor 1*k*-10 in the unit of an OFDM symbol, recovers the signals mapped to the subcarriers through FFT, and recovers the received bitstream through demodulation and decoding.

The baseband processor 1*k*-20 and the RF processor 1*k*-10 transmit and receive a signal as described above. Thus, the baseband processor 1*k*-20 and the RF processor 1*k*-10 may be indicated by a transmitter, a receiver, a transceiver, or a communicator. Moreover, at least one of the baseband processor 1*k*-20 or the RF processor 1*k*-10 may include multiple communication modules for supporting multiple different radio access technologies. In addition, at least one of the baseband processor 1*k*-20 or the RF processor 1*k*-10 may include multiple communication modules for processing signals in different frequency bands. For example, the different radio access technologies may include a wireless LAN (e.g., IEEE 802.11), a cellular network (e.g., LTE), and the like. In addition, the different frequency bands may include a super high frequency (SHF, e.g., 2.5 GHz, 5 GHz) band, and a millimeter wave (mm-wave, e.g., 60 GHz) band.

The storage unit 1*k*-30 stores data such as a basic program for operations of the UE, an application program, configuration information, and so forth. The storage unit 1*k*-30 provides the stored data at the request of the controller 1*k*-40.

The controller 1*k*-40 controls overall operations of the UE. For example, the controller 1*k*-40 may transmit and receive a signal through the baseband processor 1*k*-20 and the RF processor 1*k*-10. The controller 1*k*-40 records and reads data from and in the storage unit 1*k*-30. To this end, the controller 1*k*-40 may include at least one processor. According to an embodiment of the disclosure, the controller 1k-40 includes a multi-connection processor 1k-42 configured to perform processing to operate in a multi-connection mode. For example, the controller 1k-40 may control the UE of FIG. 1k-42 to perform a procedure of operations of the UE For example, the controller 1k-40 may include a communication processor (CP) for performing control for communication and an application processor (AP) for controlling a higher layer such as an application program.

Figure 12:
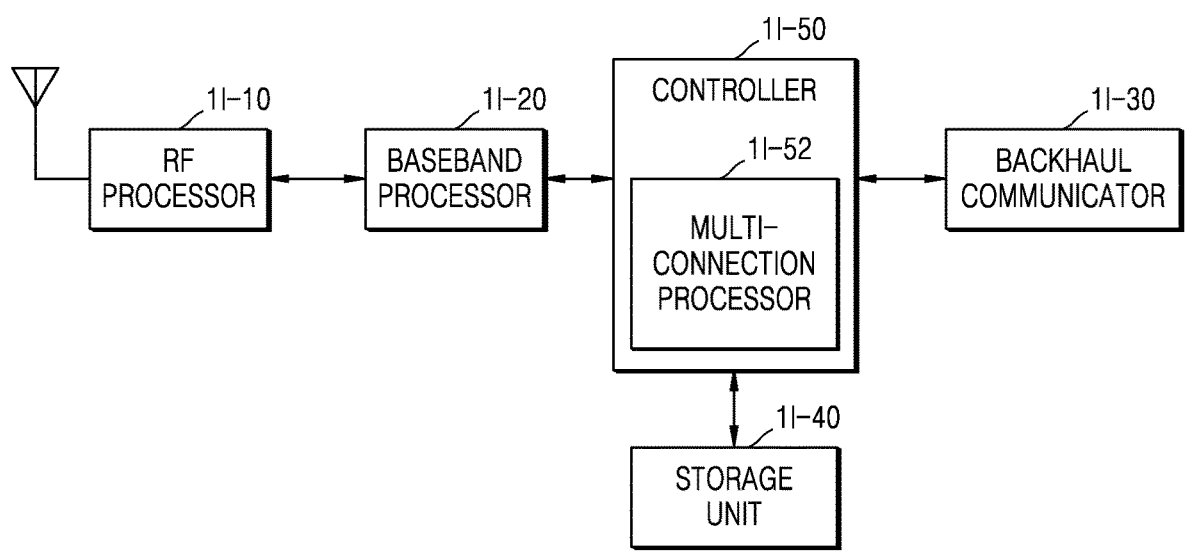
FIG. 12 illustrates a block diagram of a structure of a BS according to an embodiment of the disclosure.

FIG. 12 illustrates a block diagram of a structure of an eNB according to an embodiment of the disclosure.

As shown in FIG. 12, the eNB may include an RF processor 1l-10, a baseband processor 1l-20, a backhaul communicator 1l-30, a storage unit 1l-40, and a controller 1l-50.

The RF processor 1l-10 performs a function for transmitting and receiving a signal through a wireless channel, such as band translation, amplification, and so forth. That is, the RF processor 1l-10 up-converts a baseband signal provided from the baseband processor 1l-20 into an RF band signal, transmits the RF band signal through an antenna, and down-converts an RF band signal received through the antenna into a baseband signal. For example, the RF processor 1l-10 may include a transmission filter, a reception filter, an amplifier, a mixer, an oscillator, a DAC, an ADC, and so forth. Although one antenna is illustrated in FIG. 12, the UE may also include multiple antennas. The RF processor 1l-10 may include multiple RF chains. The RF processor 1l-10 may perform beamforming. For the beamforming, the RF processor 1l-10 may adjust phases and magnitudes of signals transmitted and received through multiple antennas or antenna elements. The RF processor 1l-10 may perform downward MIMO operations by transmitting one or more layers.

The baseband processor 1l-20 performs conversion between a baseband signal and a bitstream according to physical layer standards. For example, in data transmission, the baseband processor 1l-20 may generate complex symbols by encoding and modulating a transmission bitstream. In data reception, the baseband processor 1l-20 may recover a received bitstream by demodulating and decoding the baseband signal provided from the RF processor 1l-10. For example, when OFDM is used, in data transmission, the baseband processor 1l-20 may generate complex symbols by encoding and modulating a transmission bitstream, map the complex symbols to subcarriers, and construct OFDM symbols through IFFT and CP insertion. Also, in data reception, the baseband processor 1l-20 divides the baseband signal provided from the RF processor 1l-10 in the unit of an OFDM symbol, recovers the signals mapped to the subcarriers through FFT, and recovers the received bitstream through demodulation and decoding. The baseband processor 1l-20 and the RF processor 1l-10 transmit and receive a signal as described above. Thus, the baseband processor 1l-20 and the RF processor 1l-10 may be indicated by a transmitter, a receiver, a transceiver, a communicator, or a wireless communicator.

The backhaul communicator 1l-30 provides an interface for performing communication with other nodes in a network. That is, the backhaul communicator 1l-30 converts a bitstream transmitted to another node, e.g., an auxiliary eNB, a core network, etc., into a physical signal, and converts a physical signal received from the another node into a bitstream.

The storage unit 1l-40 stores data such as a basic program for operations of the main eNB, an application program, configuration information, and so forth. In particular, the storage unit 1l-40 stores information about a bearer allocated to the connected UE, and a measurement result reported from the connected UE. The storage unit 1l-40 stores information that is a criterion for determining whether to provide multiple connections to the UE or to stop providing the multiple connections to the UE. The storage unit 1l-40 provides the stored data at the request of the controller 1l-50.

The controller 1l-50 controls overall operations of the main eNB. For example, the controller 1l-50 may transmit and receive a signal through the baseband processor 1l-20 and the RF processor 1l-10 or through the backhaul communicator 1l-30. The controller 1l-50 records and reads data from and in the storage unit 1l-40. To this end, the controller 1l-50 may include at least one processor. According to an embodiment of the disclosure, the controller 1l-50 includes a multi-connection processor 1l-52 configured to perform processing to operate in a multi-connection mode.

According to an embodiment of the disclosure, a method for network identifier management and access by an UE may be clarified, such that an access using a new identifier may be supported in a 5G or NR system.

Hereinbelow, a method and apparatus for providing access control information in a next-generation mobile communication system (5G or NR system) will be described.

Figure 13:
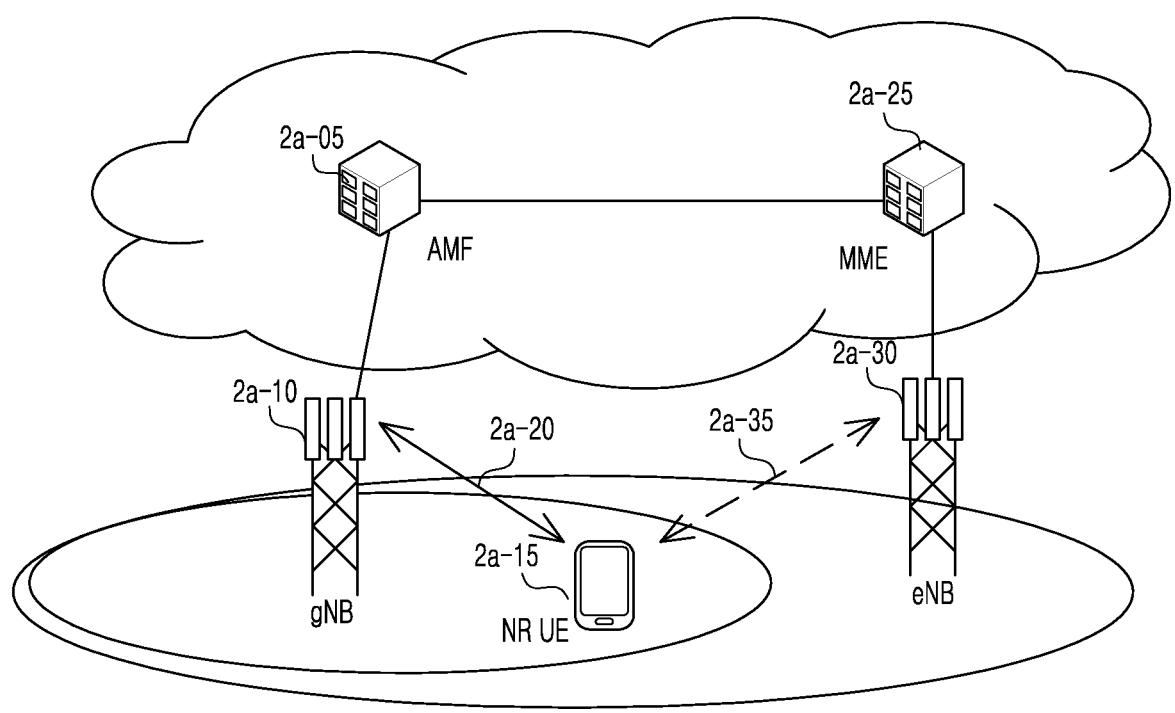
FIG. 13 illustrates a structure of a next-generation mobile communication system to which another embodiment of the disclosure is applied.

FIG. 13 illustrates a structure of a next-generation mobile communication system.

Referring to FIG. 13, a radio access network of the next-generation mobile communication system (NR system) may include a new radio node B (gNB) 2a-10 and an AMF (NR CN) 2a-05. An NR UE or UE 2a-15 may access the external network through the gNB 2a-10 and the AMF 2a-05.

In FIG. 13, the gNB 2a-10 may correspond to an eNB 2a-30 of an existing LTE system. The gNB 2a-10 may be connected to the NR UE 2a-15 over a radio channel and may provide a more advanced service than that of the existing Node B, as indicated by 2a-20. In the next-generation mobile communication system, all user traffic is served through a shared channel, requiring a device that collects state information, such as UEs' buffer status, available transmission power state, and channel state, and performs scheduling, in which the gNB 2a-10 may be responsible for these functions. One gNB 2a-10 may generally control a plurality of cells. In order to realize ultra-high-speed data transmission compared to an LTE system, the next-generation mobile communication system (5G or NR system) may have a maximum bandwidth greater than the existing maximum bandwidth and may employ a beamforming technique in addition to OFDM as a radio access technology. Also, adaptive modulation & coding (AMC) is used in which a modulation scheme and a channel coding rate are determined depending on a channel state of a UE.

The AMF 2a-05 may perform functions such as mobility support, bearer setup, QoS setup, etc. The AMF 2a-05 is in charge of various control functions as well as a mobility management function for the UE, and is connected with the plurality of ENBs. The next-generation mobile communication system may also interwork with the existing LTE system, in which the AMF 2a-105 may be connected to an MME 2a-25 through a network interface. The MME 2a-25 may be connected to the eNB 2a-30, which is an existing eNB. The UE supporting LTE-NR dual connectivity may transmit and receive data, while maintaining connection with the eNB 2a-30 as well as the gNB 2a-10, as indicated by 2a-35.

Figure 14:
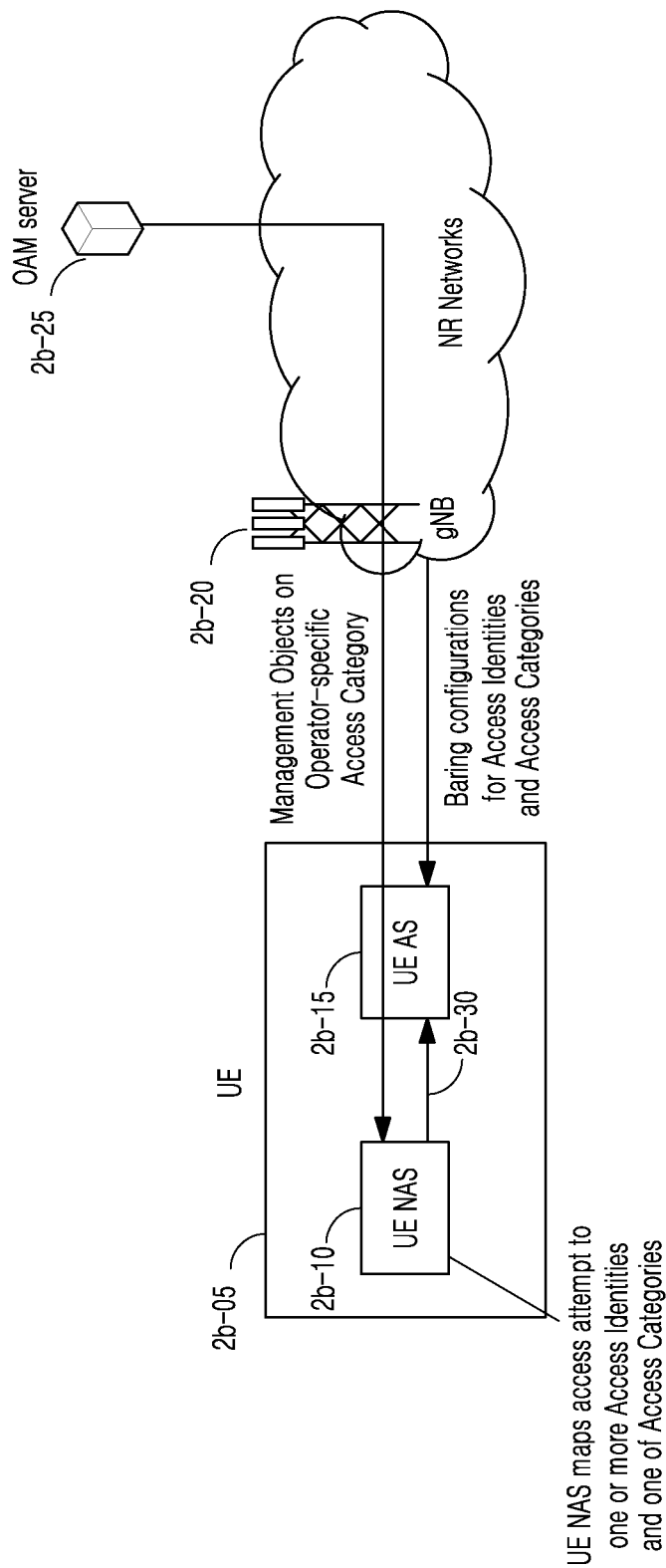
FIG. 14 illustrates a diagram for describing a process of performing access control with respect to a connected-mode or inactive-mode UE according to an embodiment of the disclosure.

FIG. 14 illustrates a diagram for describing a process of performing access control with respect to a connected-mode or inactive-mode UE according to an embodiment of the disclosure.

According to an embodiment of the disclosure, access control configuration information based on an access identity and an access category may be effectively provided. The access identity is indication information defined in the 3GPP, i.e., specified in the standard document. The access identity is used to indicate a particular access as in Table 2. The access identity mainly indicates accesses classified as Access Classes 11 through 15, a multimedia priority service (MPS), and a mission critical service (MCS). Access Classes 11 through 15 indicate accesses dedicated for operators, participants, or for public purposes.

TABLE 2

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access Identity 1 is used to provide overrides according to the subscription information in UEs configured for MPS. The subscription information defines whether an override applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN of in a PLMN that is equivalent to their HPLMN;
c) UEs that are configured for MPS and are in their HPLMN or in a PLMN that is equivalent to it.
NOTE 2:
Access Identity 2 is used to provide overrides according to the subscription information in UEs configured for MCS. The subscription information defines whether an override applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

The access category may be classified into two types. The first type may be a standardized access category. The standardized access category may be a category defined in a RAN level, that is, specified in the standard document. Thus, the same standardized access category may be applied to different operators. In an embodiment of the disclosure, a category corresponding to Emergency may be included in the standardized access category. Every access may correspond to at least one of standardized access categories. The other type may be an operator-specific (non-standardized) access category. The operator-specific (non-standardized) access category may be defined outside the 3GPP, and may not be specified in the standard document. Thus, one operator-specific access category means differently from operator to operator. This nature is the same as that of a category in an existing application specific congestion control for data communication (ACDC). An access triggered in the UE NAS may not be mapped to the operator-specific access category. A major difference from the existing ACDC is that a corresponding category may correspond to not only an application, but also other elements than the application, i.e., a service type, a call type, a UE type, a user group, a signaling type, a slice type, or a combination of the elements. That is, whether to approve an access may be controlled for accesses included in other elements. The access category may be used to indicate a particular access as in Table 3. Access categories 0 to 7 may be used to indicate the standardized access category, and access categories 32 to 63 may be used to indicate the operator-specific access category.

TABLE 3

| Access Category number | Conditions related to UE | Type of access attempt |
|---|---|---|
| 0 | All | MO Signalling resulting from paging |
| 1 (NOTE 1) | UE is configured for delay tolerant service and subject to access control for Access Category 1, which is judged based an relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

An operator server 2b-25 may provide information about the operator-specific access category, a management object (MO) to the UE NAS through NAS signaling or application-level data transmission. The information about the operator-specific access category may include information about which element, such as an element, each operator-specific category corresponds to. For example, it may be indicated in information regarding the operator-specific access category that the access category 32 corresponds to an access corresponding to a particular application (e.g., a Facebook application). A gNB 2b-20 may provide a category list including barring configuration information and barring configuration information corresponding to each category to UEs. A UE 2b-05 may include logical blocks of an NAS 2b-10 and an AS 2b-15.

The UE NAS may map a triggered access to one or more access identities and one or more access categories according to a specific rule. Such a mapping operation is performed in all RRC states, i.e., a connected mode (RRC_CONNECTED), an idle mode (RRC_IDLE), and an inactive mode (RRCC_INACTIVE). Characteristics of each RRC state are as follows:

RRC_IDLE:
  A UE specific DRX may be configured by upper layers;
  UE controlled mobility based on network configuration;
  The UE:
  Monitors a Paging channel;
  Performs neighbouring cell measurements and cell (re-) selection;
  Acquires system information.

RRC_INACTIVE:
  A UE specific DRX may be configured by upper layers or by RRC layer;
  UE controlled mobility based on network configuration;
  The UE stores the AS context;
  The UE:
  Monitors a Paging channel;
  Performs neighbouring cell measurements and cell (re-) selection;
  Performs RAN-based notification area updates when moving outside the RAN-based notification area;
  Acquires system information.

RRC_CONNECTED:
  The UE stores the AS context.
  Transfer of unicast data to/from UE.
  At lower layers, the UE may be configured with a UE specific DRX;
  For UEs supporting CA, use of one or more SCells, aggregated with the SpCell, for increased bandwidth;
  For UEs supporting DC, use of one SCG, aggregated with the MCG, for increased bandwidth;
  Network controlled mobility, i.e. handover within NR and to/from E-UTRAN.
  The UE:
  Monitors a Paging channel;
  Monitors control channels associated with the shared data channel to determine if data is scheduled for it;
  Provides channel quality and feedback information;
  Performs neighbouring cell measurements and measurement reporting;
  Acquires system information.

In another option, in access category mapping, when one access is mappable to one standardized access category, the access may further be mapped to one operator-specific access category. The UE NAS may deliver an access identity and an access category that are mapped together with a service request to the UE AS.

When the UE AS is provided with access identity or access category information together with a message received from the UE NAS in all RRC states, the UE AS performs a barring check operation of determining whether a radio access caused by the message is allowed before performing the radio access. When the radio access is allowed through a barring check operation, the UE AS requests RRC connection setup. For example, an NAS of the UE in the connected mode or the inactive mode may transmit an access identity and an access category to the UE AS for reasons provided below as indicated by 2b-30. In an embodiment of the disclosure, the reasons will be collectively referred to as a 'new session request'.

new MINITEL voice or video session
  sending of SMS (SMS over IP, or SMS over NAS)
  new PDU session establishment
  existing PDU session modification
  service request to re-establish the user plane for an existing PDU session On the other hand, the NAS of the idle-mode UE may transmit an access identity and an access category when the NAS transmits a service request message.

The UE AS may determine using the barring configuration information whether an access triggered by the UE NAS is allowed (barring check).

An operator may would like to allow a particular service type among accesses corresponding to at least one of Access Classes 11 through 15. Thus, in an embodiment of the disclosure, whether to allow accesses belonging to Access Classes 11, 12, 13, 14, and 15 indicated by access identifies may be determined based on attributes distinguished by the access category. To this end, a method of configuring barring configuration information of an access identity or access category will be described. In an embodiment of the disclosure, the barring configuration information of the access category may include ac-barringFactor and ac-barringTime like in barring configuration information of existing access class barring (ACB) or ACDC.

Figure 15:
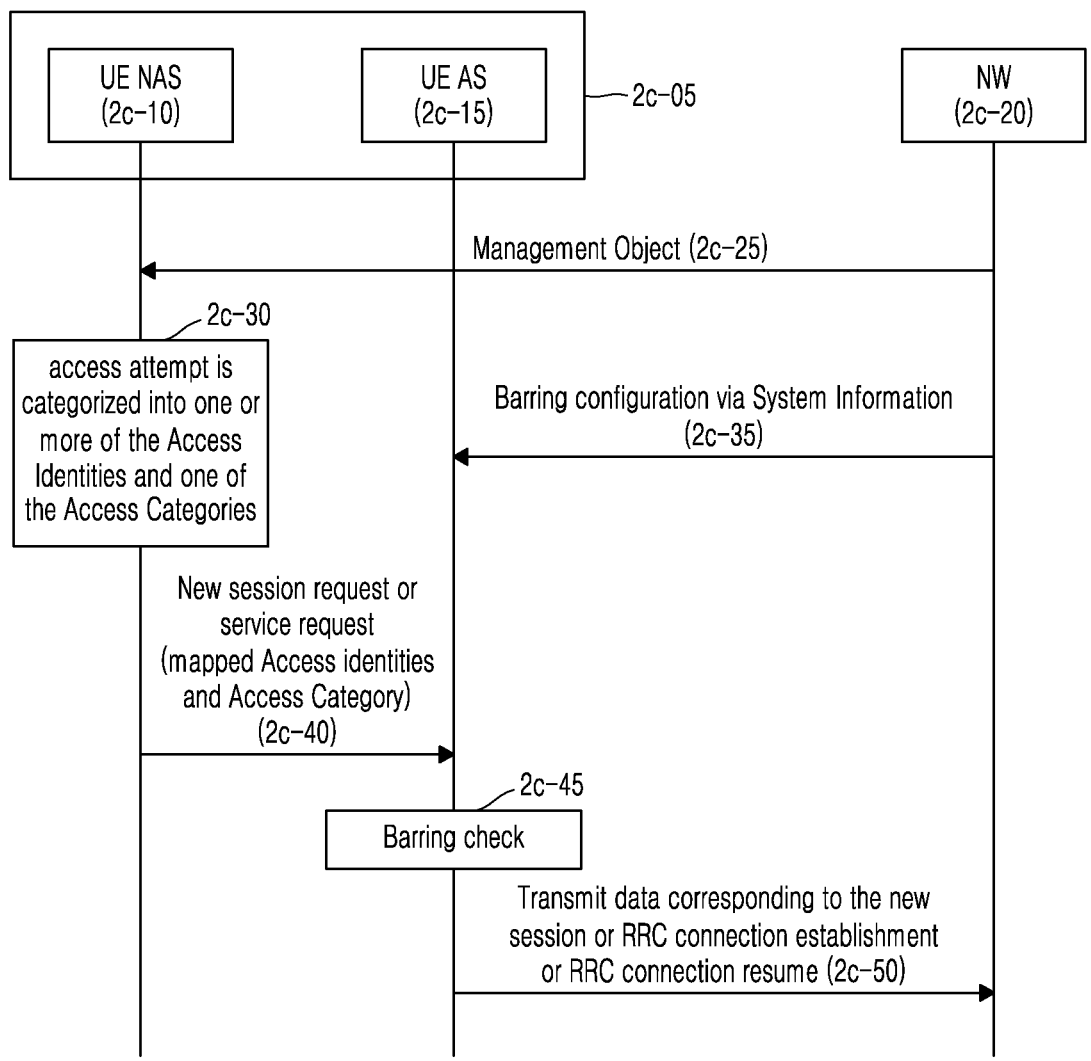
FIG. 15 illustrates a diagram for describing a process of performing access control with respect to a connected-mode or inactive-mode UE in another aspect, according to an embodiment of the disclosure.

FIG. 15 illustrates a diagram for describing a process of performing access control with respect to a connected-mode or inactive-mode UE in another aspect, according to an embodiment of the disclosure.

A UE 2c-05 may include an NAS 2c-10 and an AS 2c-15. The NAS is responsible for processes that are directly related to wireless connection, i.e., authentication, service request, and session management, and the AS is responsible for processes related to wireless connection. The network may provide management object information to an NAS by using an operation, administration, and maintenance (OAM) (a data message in an application level) or NAS message in operation 2c-25. The management object information may indicate an element, for example, an application, etc., to which each operator-specific access category corresponds. The NAS may use the management object information to determine an operator-specific category to which a triggered access is mapped. The triggered access may correspond to a new MMTEL service (voice call and video call), SMS transmission, new PDU session establishment, existing PDU session change, etc. The NAS may map attributes of the service with corresponding access identity and access category when the service is triggered, in operation 2c-30.

The service may not be mapped with any access identity, but may be mapped with one or more access identities. The service may be mapped with one access category. When the service is mapped with one access category, it is first determined whether the service is mapped with an operator-specific access category provided by the management object. When the service is not mapped with any operator-specific access category, the service may be mapped with corresponding one of the standardized access categories. When the service is mapped with a plurality of access categories, one service may be mapped with one operator-specific access category and one standardized access category. However, when the service is not mapped with any operator-specific access category, the service may be mapped with a corresponding one of the standardized access categories.

In such a mapping rule, an emergency service may be an exception. The NAS may transmit a new session request or a service request, together with the mapped access identity and access category, to the AS in operation 2c-40. The NAS may transmit the new session request in the connected mode or the inactive mode and the service request in the idle mode. The AS may receive barring configuration information from system information broadcast by the network in operation 2c-35. An example of a structure of ASN.1 of barring configuration information is as below, and a detailed description thereof will be provided below.

```
UAC-BarringPerPLMN-List ::=    SEQUENCE (SIZE (1.. maxPLMN)) OF UAC-BarringPerPLMN
UAC-BarringPerPLMN ::=         SEQUENCE {
        plmn-IdentityIndex                 INTEGER (1..maxPLMN),
        uac-ACBarringListType      CHOICE{
           uac-ImplicitACBarringList       SEQUENCE (SIZE(maxAccessCat-1)) OF
UAC-BarringInfoSetIndex,
           uac-ExplicitACBarringList       UAC-BarringPerCatList
           }
}
UAC-BarringPerCatList ::= SEQUENCE (SIZE (1..maxAccessCat-1)) OF UAC-BarringPerCat
UAC-BarringperCat ::= SEQUENCE {
        accessCategory                    INTEGER (1..maxAccessCat-1),
        uac-barringInfoSetIndex           UAC-BarringInfoSetIndex
}
UAC-BarringInfoSetIndex ::=            INTEGER (1..maxBarringInfoSet)
UAC-BarringInfoSetList ::= SEQUENCE (SIZE (1..maxBarringInfoSet)) OF UAC-BarringInfoSet
UAC-BarringInfoSet ::= SEQUENCE {
    uac-BarringFactor           ENUMERATED {
                                    p00, p05, p10, p15, p20, p25, p30, p40,
                                    p50, p60, p70, p75, p80, p85, p90, p95},
    uac-BarringTime             ENUMERATED (s4, s8, s16, s32, s64, s128, s256, s512),
    uac-BarringForAccessIdentity             BIT STRING (SIZE(7))
}
```

The AS may determine whether the service request is allowed, by using the mapped access identity and access category information mapped by the NAS and the corresponding barring configuration information received from the network in operation 2c-45. In an embodiment of the disclosure, an operation of determining whether the service request is allowed will be referred to as barring check. The UE may receive system information including access control configuration information and store configuration information. The barring configuration information may be provided per public land mobile network (PLMN) and access category. A BarringPerCatList IE may be used to provide barring configuration information of access categories belonging to one PLMN. To this end, a PLMN id and barring configuration information of each access category may be included in an IE in the form of a list. In barring configuration information per access category, an access category id (or index) indicating a particular access category, a uac-BarringForAccessIdentity field, a uac-BarringFactor field, and a uac-Barringtime field may be included. The above-described barring check operation is as below. First, each bit constituting uac-BarringForAccessIdentityList may correspond to one access identity, in which a bit value '0' indicates that an access related to an access identity is allowed. For at least one of the mapped access identities, when at least one of corresponding bits in uac-BarringForAccessIdentity is '0', an access is allowed. For at least one of the mapped access identities, when any one of the corresponding bits in uac-BarringForAccessIdentity is not '0', an additional barring check may be performed by further using a uac-BarringFactor field. uac-BarringFactor α may be in a range of 0≤α<1. The UE AS may derive a random value rand in a range of 0≤rand<1, and determine that the access is not prohibited when the random value is less than uac-BarringFactor, and determine that the access is prohibited otherwise. When the UE AS determines that the access is prohibited, the UE AS may delay an access attempt during a time derived using Equation 1. The UE AS may drive a timer having a specific time value. In an embodiment of the disclosure, the timer may be referred to as a barring timer.

$$\text{\textit{T}barring}=(0.7+0.6*\text{rand})*\textit{uac}\text{-BarringTime} \quad \text{Equation 1}$$

When the access is prohibited, the UE AS may notify so to the UE NAS. When the derived time has expired, the UE AS may notify to the UE NAS that an access is requested again (barring alleviation). From that point, the UE NAS may request again an access from the UE AS.

According to a specific rule, when a service request is allowed, the AS may transmit an RRC connection establishment request or RRC connection resume request or data related to a new session to the network in operation 2c-50.

Figure 16:
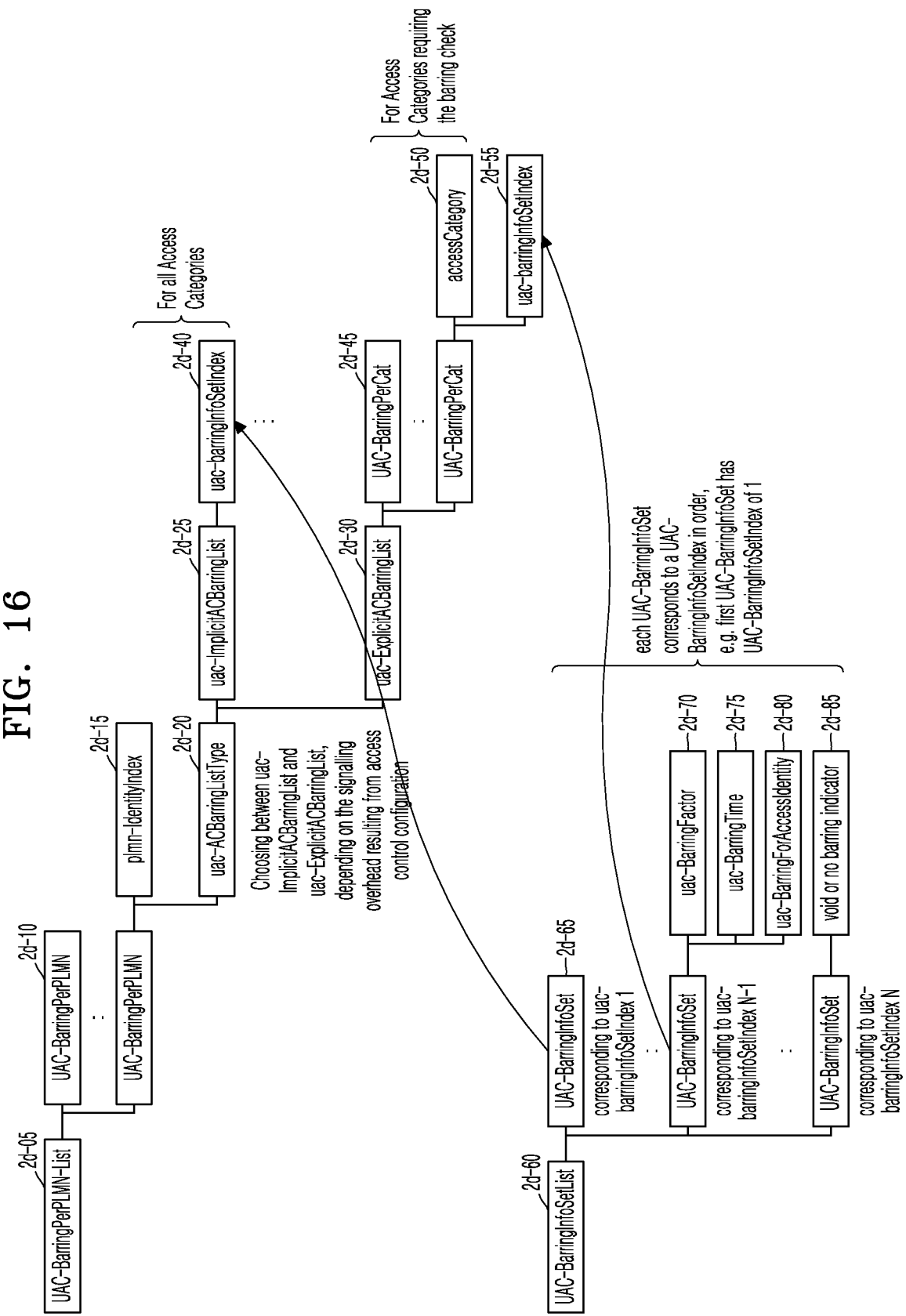
FIG. 16 illustrates a diagram for describing a method of configuring access control information according to an embodiment of the disclosure.

FIG. 16 illustrates a diagram for describing a method of configuring access control information according to an embodiment of the disclosure.

In an embodiment of the disclosure, access control information may include UAC-BarringPerPLMN-List 2d-05 and UAC-BarringInfoSetList 2d-60. Barring configuration information including ac-BarringFactor, uac-BarringTime, and uac-BarringForAccessIdentity may be provided for each access category. The barring configuration information per access category may differ with PLMN. UAC-BarringPerPLMN-List may include barring configuration information of access categories per PLMN. In terms of signaling overhead, it may be desirable to provide barring configuration information for access categories requiring barring check. For more efficient signaling, when a list of a limited number of barring configuration information may be provided and barring configuration information applied for each access category is indexed from the list, then the signaling overhead may be minimized. The list may be UAC-BarringInfoSetList, and may include UAC-BarringInfoSet 2d-65 having included thereto barring configuration information that is set to a particular value. In an order of the included UAC-BarringInfoSet, one index value uac-barringInfoSetIndex may correspond to the UAC-BarringInfoSet. The maximum number of UAC-BarringInfoSets that may be included in the list may be 8. Depending on a need of the network, a list of a number of UAC-BarringInfoSet within a maximum number may be broadcast.

Barring configuration information of each PLMN may be included in a UAC-BarringPerPLMN 2d-10. The UAC-BarringPerPLMN may largely include plmn-IdentityIndex 2d-15 that is identification information indicating the PLMN and uac-ACBarringListType 2d-20 that includes the barring configuration information. A structure for including the barring configuration information may be divided into uac-ImplicitACBarringList 2d-25 and uac-ExplicitACBarring- List 2*d*-30. When the number of access categories requiring barring check is greater than or equal to a specific value, uac-ImplicitACBarringList may be useful in terms of signaling overhead; otherwise, uac-ExplicitACBarringList may be useful in terms of signaling overhead. The eNB may broadcast barring configuration information by selecting one of structures according to whether the number of a total of access categories requiring barring check is greater than or equal to a particular value or the amount of barring configuration information is greater than or equal to a specific value. Referring to each signaling structure, one index value, usa-barringInfoSetIndex 2*d*-40, of UAC-BarringInfoSet for all valid (defined) access categories is sequentially included in uac-ImplicitACBarringList according to an access category number. On the other hand, an indicator indicating an access category, accessCategory 2*d*-50, for access categories requiring barring check and UAC-BarringPerCat 2*d*-45 including one index value uac-barringInfoSetIndex 2*d*-55 among UAC-BarringInfoSet may be included in uac-ExplicitACBarringList. One UAC-BarringPerCat may correspond to one access category.

A description will be made of a method of configuring uac-barringInfoSetIndex for an access category for which an access is allowed without requiring barring check in a uac-ImplicitACBarringList structure in an embodiment of the disclosure. The eNB may apply one of the following options for indicating the access category for which an access is allowed without barring check to the access category.

Option 1) Predefined UAC-BarringInfoSetIndex is mapped and the index value indicates that an access is allowed. For example, among a total of 8 uac-barringInfoSetIndex, the smallest index value or the largest index value may be used to indicate no barring. UAC-BarringInfoSet mapped to an index may not be provided or may be regarded as a dummy.

Option 2) UAC-BarringInfoSetIndex that does not correspond to any UAC-BarringInfoSet is mapped. The index value having no corresponding UAC-BarringInfoSet is regarded as indicating no barring.

Option 3) UAC-BarringInfoSetIndex corresponding to UAC-BarringInfoSet including an indicator indicating that an access is allowed or without including any information is mapped. Although an UAC-BarringInfoSet IE mapped to an index exists, uac-BarringFactor, uac-BarringTime, and uac-BarringForAccessIdentity that are generally included in UAC-BarringInfoSet are not included in UAC-BarringInfoSet. Instead, an indicator indicating no barring may be included, or any information may not be included.

Option 4) New 1-bit information indicating no barring is further defined in uac-BarringForAccessIdentity information in the form of a bitmap. uac-BarringForAccessIdentity included in UAC-BarringInfoSet corresponding to UAC-BarringInfoSetIndex to be used for indicating no barring may have 1-bit information that is set to 0 indicating no barring. The uac-BarringForAccessIdentity information is used to indicate whether an access generally mapped to an access identity (and emergency) is allowed. Additionally, when new bit information is set to no barring, UAC-BarringInfoSet may not include a uac-BarringFactor field and a uac-Barringtime field.

Figure 17:
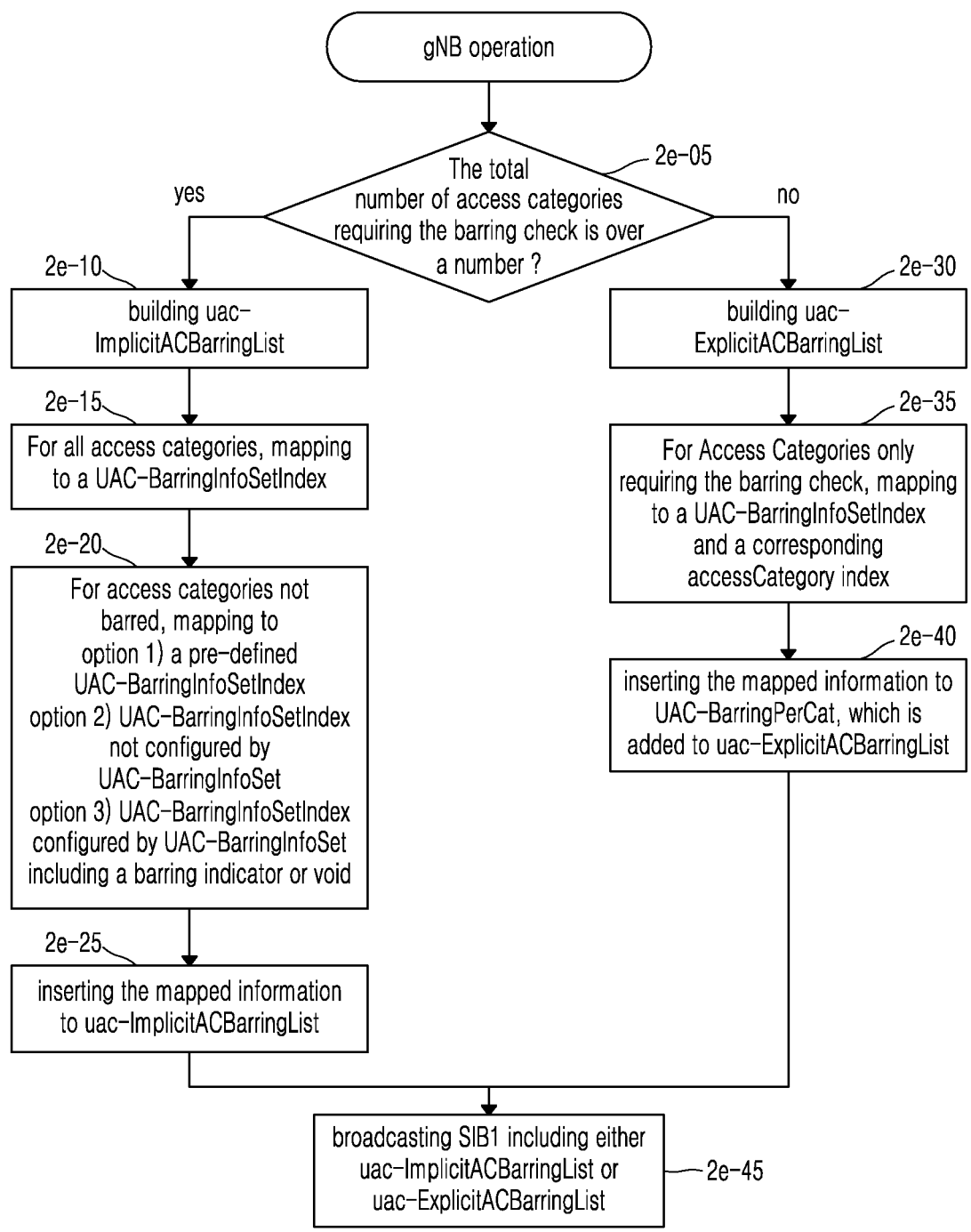
FIG. 17 illustrates a flowchart of operations of an eNB according to an embodiment of the disclosure.

FIG. 17 illustrates a flowchart of operations of a gNB according to an embodiment of the disclosure.

In operation 2*e*-05, the gNB may determine whether a total number of access categories requiring barring check is greater than or equal to a specific value. The gNB may determine whether the amount of barring configuration information of the access categories is greater than or equal to a specific value.

In operation 2*e*-10, when the gNB may configure uac-ImplicitACBarringList when a total number of access categories requiring barring check is greater than or equal to a specific value.

In operation 2*e*-15, the gNB may map UAC-BarringInfoSetIndex to all access categories of the gNB.

In operation 2*e*-20, the gNB may apply one of the following options for indicating the access category for which an access is allowed without barring check to the access category.

Option 1) Predefined UAC-BarringInfoSetIndex is mapped and an index value indicates that an access is allowed.

Option 2) UAC-BarringInfoSetIndex that does not correspond to any UAC-BarringInfoSet may be mapped.

Option 3) UAC-BarringInfoSetIndex corresponding to UAC-BarringInfoSet including an indicator indicating that an access is allowed or without including any information is mapped. uac-BarringFactor, uac-BarringTime, and uac-BarringForAccessIdentity that are generally included in UAC-BarringInfoSet are not included in UAC-BarringInfoSet.

Option 4) New 1-bit information indicating no barring is further defined in uac-BarringForAccessIdentity information in the form of a bitmap. uac-BarringForAccessIdentity included in UAC-BarringInfoSet corresponding to UAC-BarringInfoSetIndex to be used for indicating no barring may have 1-bit information that is set to 0 indicating no barring. The uac-BarringForAccessIdentity information is used to indicate whether an access generally mapped to an access identity (and emergency) is allowed. Additionally, when new bit information is set to no barring, UAC-BarringInfoSet may not include a uac-BarringFactor field and a uac-Barringtime field. For the other access categories requiring barring check, one UAC-BarringInfoSetIndex corresponding to UAC-BarringInfoSet including uac-BarringFactor, uac-BarringTime, and uac-BarringForAccessIdentity may be mapped.

In operation 2*e*-25, for all access categories, all the mapped index information may be included in uac-ImplicitACBarringList.

In operation 2*e*-30, otherwise, the gNB may configure uac-ExplicitACBarringList.

In operation 2*e*-35, the gNB may map one UAC-BarringInfoSetIndex corresponding to UAC-BarringInfoSet including an ID (index value) indicating an access category, and uac-BarringFactor, uac-BarringTime, and uac-BarringForAccessIdentity for the access categories requiring barring check.

In operation 2*e*-40, the gNB may include information mapped to each access category to UAC-BarringPerCat and values of UAC-BarringPerCat of the access categories to uac-ExplicitACBarringList.

In operation 2*e*-45, the gNB may include the configured uac-ImplicitACBarringList or uac-ExplicitACBarringList to a SIB and broadcast the SIB.

Figure 18:
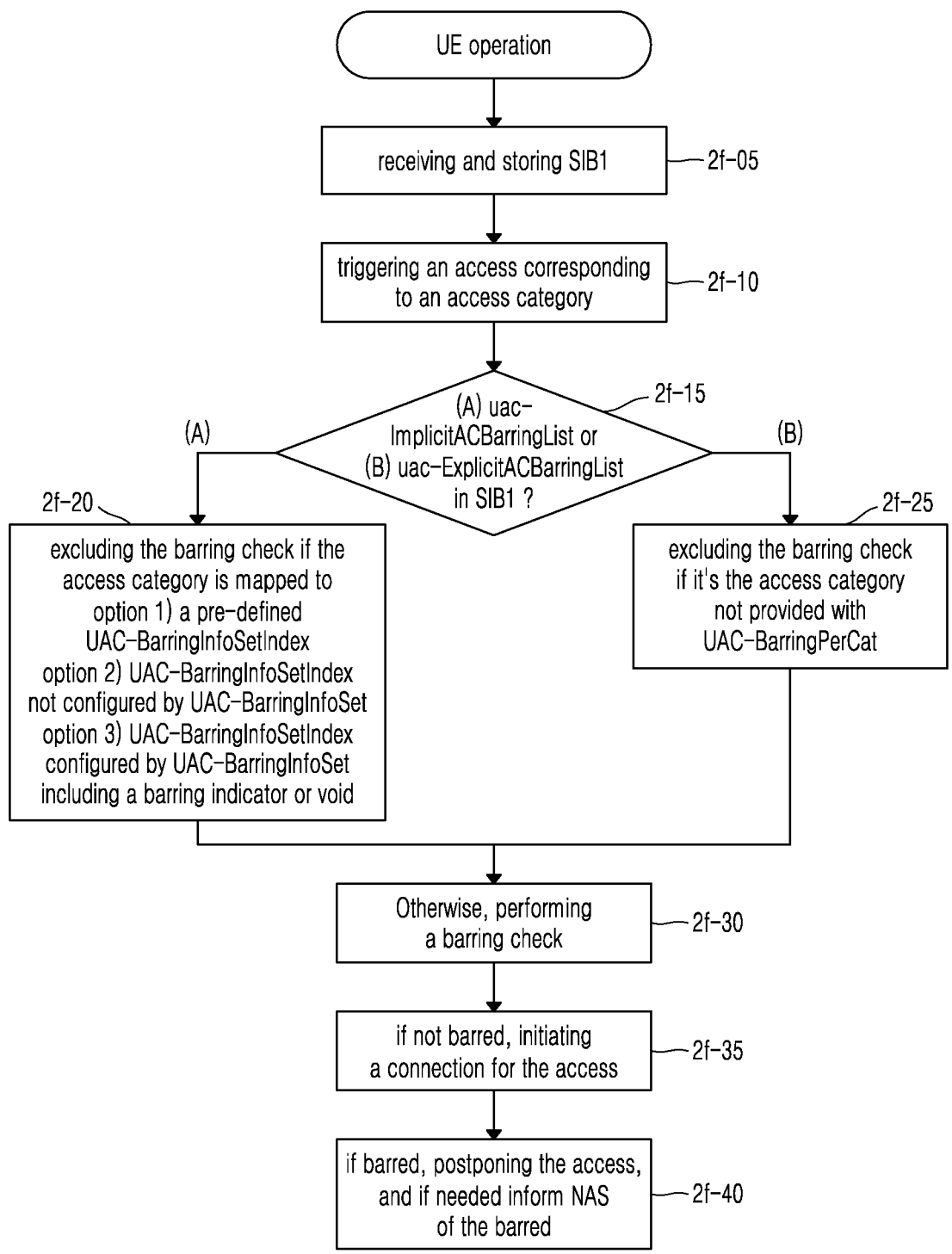
FIG. 18 illustrates a flowchart of operations of a UE according to an embodiment of the disclosure.

FIG. 18 illustrates a flowchart of operations of a UE according to an embodiment of the disclosure.

In operation 2*f*-05, the UE may receive the SIB broadcast from the gNB and store the received SIB. The SIB may include baring configuration information.

In operation 2*f*-10, the UE may trigger an access corresponding to one access category. The access may be triggered by the UE NAS or AS.

In operation 2f-15, the UE may determine whether uac-ACBarringListType of the barring configuration information is uac-ImplicitACBarringList or uac-ExplicitACBarringList.

In operation 2f-20, when uac-ACBarringListType is uac-ImplicitACBarringList, the UE may not perform barring check for an access category corresponding to the following options and regard an access as being allowed.

Option 1) access category mapped to predefined UAC-BarringInfoSetIndex indicating that an access is allowed.

Option 2) access category mapped to UAC-BarringInfoSetIndex that does not correspond to any UAC-BarringInfoSet.

Option 3) access category mapped to UAC-BarringInfoSetIndex corresponding to UAC-BarringInfoSet including an indicator indicating that an access is allowed or without including any information.

In operation 2f-25, when uac-ACBarringListType is uac-ExplicitACBarringList, the UE may not perform barring check for an access category having no corresponding UAC-BarringPerCat and may regard an access as being allowed.

In operation 2f-30, when an access for an access category other than the access category for which the access is allowed is triggered, the UE may perform baring check for the access, by using stored barring configuration information.

In operation 2f-35, when the access is allowed as a result of barring check, the UE may perform connection for the access.

In operation 2f-40, when the access is not allowed as the result of barring check, the UE may delay connection for the access for a specific time.

Figure 19:
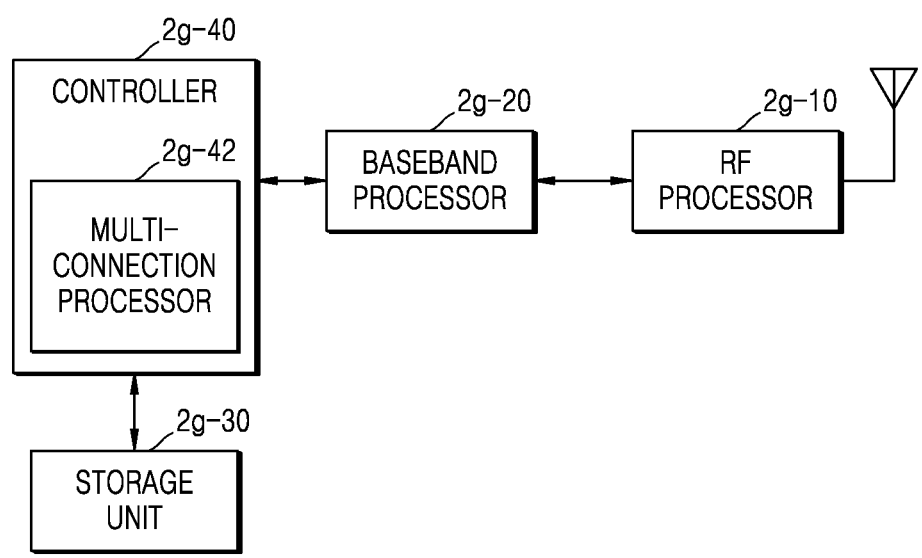
FIG. 19 illustrates a block diagram of a structure of a UE according to an embodiment of the disclosure.

FIG. 19 illustrates a block diagram of a structure of a UE according to an embodiment of the disclosure.

Referring to FIG. 19, the UE may include a radio frequency (RF) processor 2g-10, a baseband processor 2g-20, a storage unit 2g-30, and a controller 2g-40.

Figure 20:
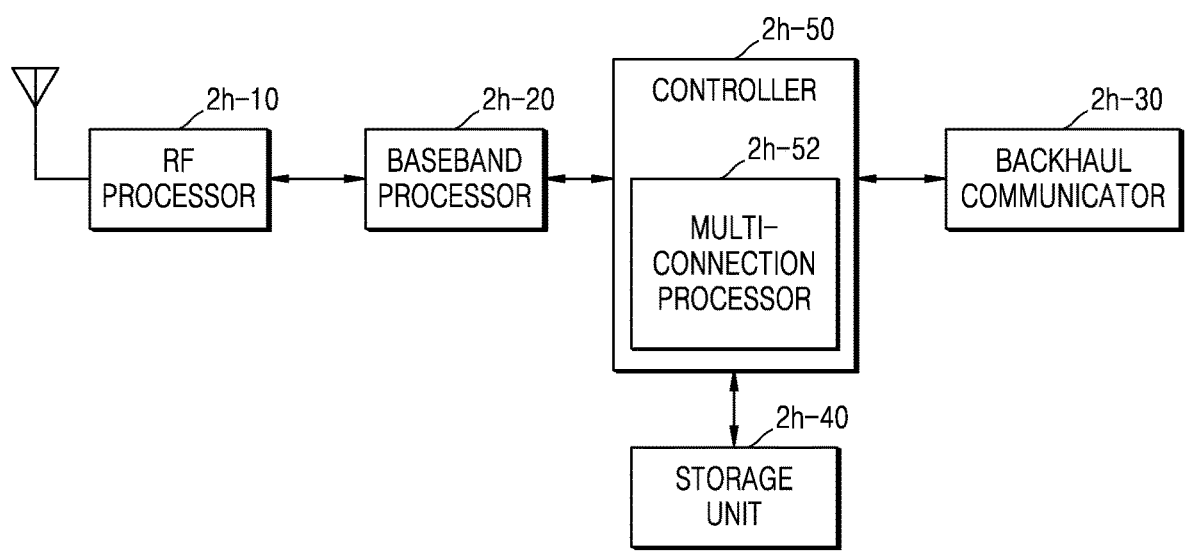
FIG. 20 illustrates a block diagram of a structure of an eNB according to an embodiment of the disclosure.

The RF processor 2g-10 performs a function for transmitting and receiving a signal through a wireless channel, such as band translation, amplification, and so forth. That is, the RF processor 2g-10 up-converts a baseband signal provided from the baseband processor 2g-20 into an RF band signal, transmits the RF band signal through an antenna, and down-converts an RF band signal received through the antenna into a baseband signal. For example, the RF processor 2g-10 may include a transmission filter, a reception filter, an amplifier, a mixer, an oscillator, a DAC, an ADC, and so forth. Although one antenna is illustrated in FIG. 20, the UE may also include multiple antennas. The RF processor 2g-10 may include multiple RF chains. The RF processor 2g-10 may perform beamforming. For the beamforming, the RF processor 2g-10 may adjust phases and magnitudes of signals transmitted and received through multiple antennas or antenna elements. The RF processor 2g-10 may also perform MIMO and may receive several layers when performing MIMO operations.

The baseband processor 2g-20 performs conversion between a baseband signal and a bitstream according to physical layer standards of a system. For example, in data transmission, the baseband processor 2g-20 may generate complex symbols by encoding and modulating a transmission bitstream. In data reception, the baseband processor 2g-20 may recover a received bitstream by demodulating and decoding the baseband signal provided from the RF processor 2g-10. For example, when OFDM is used, in data transmission, the baseband processor 2g-20 may generate complex symbols by encoding and modulating a transmission bitstream, map the complex symbols to subcarriers, and construct OFDM symbols through IFFT and CP insertion. Also, in data reception, the baseband processor 2g-20 divides the baseband signal provided from the RF processor 2g-10 in the unit of an OFDM symbol, recovers the signals mapped to the subcarriers through FFT, and recovers the received bitstream through demodulation and decoding.

The baseband processor 2g-20 and the RF processor 2g-10 transmit and receive a signal as described above. Thus, the baseband processor 2g-20 and the RF processor 2g-10 may be indicated by a transmitter, a receiver, a transceiver, or a communicator. Moreover, at least one of the baseband processor 2g-20 or the RF processor 2g-10 may include multiple communication modules for supporting multiple different wireless connection techniques. In addition, at least one of the baseband processor 2g-20 or the RF processor 2g-10 may include multiple communication modules for processing signals in different frequency bands. For example, the different radio access technologies may include a wireless LAN (e.g., IEEE 802.11), a cellular network (e.g., LTE), and the like. In addition, the different frequency bands may include a super high frequency (SHF, e.g., 2.5 GHz, 5 GHz) band, and a millimeter wave (mm-wave, e.g., 60 GHz) band.

The storage unit 2g-30 stores data such as a basic program for operations of the UE, an application program, configuration information, and so forth. The storage unit 2g-30 provides the stored data at the request of the controller 2g-40.

The controller 2g-40 controls overall operations of the UE. For example, the controller 2g-40 may transmit and receive a signal through the baseband processor 2g-20 and the F processor 2g-10. The controller 2g-40 records and reads data from and in the storage unit 2g-30. To this end, the controller 2g-40 may include at least one processor. According to an embodiment of the disclosure, the controller 2g-40 includes a multi-connection processor 2g-42 configured to perform processing to operate in a multi-connection mode. For example, the controller 2g-40 may control the UE of FIG. 2g-42 to perform a procedure of operations of the UE. For example, the controller 2g-40 may include a CP for performing control for communication and an AP for controlling a higher layer such as an application program.

FIG. 20 illustrates a block diagram of a structure of an eNB according to an embodiment of the disclosure.

As shown in FIG. 20, the eNB may include an RF processor 2h-10, a baseband processor 2h-20, a backhaul communicator 2h-30, a storage unit 2h-40, and a controller 2h-50.

The RF processor 2h-10 may perform a function for transmitting and receiving a signal through a wireless channel, such as band translation, amplification, and so forth. That is, the RF processor 2h-10 up-converts a baseband signal provided from the baseband processor 2h-20 into an RF band signal, transmits the RF band signal through an antenna, and down-converts an RF band signal received through the antenna into a baseband signal. For example, the RF processor 2h-10 may include a transmission filter, a reception filter, an amplifier, a mixer, an oscillator, a DAC, an ADC, and so forth. Although one antenna is illustrated in FIG. 20, the UE may also include multiple antennas. The RF processor 2h-10 may include multiple RF chains. The RF processor 2h-10 may perform beamforming. For the beamforming, the RF processor 2h-10 may adjust phases and magnitudes of signals transmitted and received through multiple antennas or antenna elements. The RF processor 2h-10 may perform downward MIMO operations by transmitting one or more layers.

The baseband processor 2h-20 performs conversion between a baseband signal and a bitstream according to physical layer standards of a system. For example, in data transmission, the baseband processor 2h-20 may generate complex symbols by encoding and modulating a transmission bitstream. In data reception, the baseband processor 2h-20 may recover a received bitstream by demodulating and decoding the baseband signal provided from the RF processor 2h-10. For example, when OFDM is used, in data transmission, the baseband processor 2h-20 may generate complex symbols by encoding and modulating a transmission bitstream, map the complex symbols to subcarriers, and construct OFDM symbols through IFFT and CP insertion. Also, in data reception, the baseband processor 2h-20 divides the baseband signal provided from the RF processor 2h-10 in the unit of an OFDM symbol, recovers the signals mapped to the subcarriers through FFT, and recovers the received bitstream through demodulation and decoding. The baseband processor 2h-20 and the RF processor 2h-10 transmit and receive a signal as described above. Thus, the baseband processor 2h-20 and the RF processor 2h-10 may be indicated by a transmitter, a receiver, a transceiver, a communicator, or a wireless communicator.

The backhaul communicator 2h-30 provides an interface for performing communication with other nodes in a network. That is, the backhaul communicator 2h-30 converts a bitstream transmitted to another node, e.g., an auxiliary eNB, a core network, etc., into a physical signal, and converts a physical signal received from the another node into a bitstream.

The storage unit 2h-40 stores data such as a basic program for operations of the main eNB, an application program, configuration information, and so forth. In particular, the storage unit 2h-40 stores information about a bearer allocated to the connected UE, and a measurement result reported from the connected UE. The storage unit 2h-40 stores information that is a criterion for determining whether to provide or stop multiple connections to the UE. The storage unit 2h-40 provides the stored data at the request of the controller 2h-50.

The controller 2h-50 controls overall operations of the main eNB. For example, the controller 2h-50 may transmit and receive a signal through the baseband processor 2h-20 and the RF processor 2h-10 or through the backhaul communicator 2h-30. The controller 2h-50 records and reads data from and in the storage unit 2h-40. To this end, the controller 2h-50 may include at least one processor. According to an embodiment of the disclosure, the controller 2h-50 includes a multi-connection processor 2h-52 configured to perform processing to operate in a multi-connection mode.

The methods according to the embodiments of the disclosure described in the claims or specification of the disclosure may be implemented by hardware, software, or a combination thereof.

When the methods are implemented by software, a computer-readable storage medium or a computer program product having stored therein one or more programs (software modules) may be provided. The one or more programs stored in the computer-readable storage medium or computer program product may be configured for execution by one or more processors in an electronic device. The one or more programs include instructions that cause the electronic device to execute the methods according to the embodiments of the disclosure described in the claims or the specification of the disclosure.

These programs (software modules and software) may be stored in random access memories (RAMs), non-volatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

According to disclosed embodiments of the disclosure, a service may be effectively provided in a mobile communication system.

In the detailed embodiments of the disclosure, components included in the disclosure have been expressed as singular or plural according to the provided detailed embodiment of the disclosure.

In an embodiment of the disclosure, the parameters UAC-BarringInfoSet, UAC-BarringInfosetList, uac-BarringPerPLMN, uac-BarringPerPLMN-List, uac-BarringInfo, and BarringInfoSetIndex may be expressed as barring setting information, a barring setting information list, barring information per PLMN, a PLMN-specific barring information list, barring information, and a barring configuration information index, respectively.

The parameters plmn-IdentityIndex, uac-ACBarringListType, uac-ImplicitACBarringList, uac-ExplicitACBarringList, accessCategory, and UAC-BarringPerCat may be expressed as a PLMN ID index, barring list type information, an implicit barring list, an explicit barring list, access category information, and category-specific barring information, respectively. However, singular or plural expressions have been selected properly for a condition provided for convenience of a description, and the disclosure is not limited to singular or plural components and components expressed as plural may be configured as a single component or a component expressed as singular may also be configured as plural components.

Meanwhile, the embodiments of the disclosure of the present specification and drawings have been provided to easily describe the disclosure and to help with the understanding of the disclosure, and are not intended to limit the scope of the disclosure. In other words, it is apparent to one of ordinary skill in the art that various changes may be made thereto without departing from the scope of the disclosure. In addition, the embodiments of the disclosure may be used in combination when necessary. For example, an embodiment of the disclosure may be combined with some parts of another embodiment of the disclosure. In addition, other modifications based on the technical spirit of the above-described embodiment of the disclosure may also be carried out in other systems, e.g., an LTE system, a 5G system, an NR system, etc.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, system information comprising first information on at least one barring information set and second information on at least one access category specific barring configuration per public land mobile network (PLMN), wherein the second information includes information on a barring list type, and the information on the barring list type includes an implicit barring list or an explicit barring list; and
   in case that the information on the barring list type includes the implicit barring list, determining whether to perform an access barring check based on the implicit barring list and the first information,
   wherein the access barring check is performed in case that at least one index for the barring information set included in the implicit barring list corresponds to the at least one barring information set included in the first information.

2. The method of claim 1, wherein:
   the second information further includes an index for PLMN identity.

3. The method of claim 1, wherein the access barring check is not performed in case that the at least one index for the barring information set included in the implicit barring list does not correspond to the at least one barring information set included in the first information.

4. The method of claim 1, further comprising:
   in case that the information on the barring list type includes the explicit barring list, determining whether to perform the access barring check based on the explicit barring list and the first information,
   wherein the access barring check is performed in case that at least one index for the barring information set included in the explicit barring list corresponds to the at least one barring information set included in the first information.

5. The method of claim 4, wherein the access barring check is not performed in case that the at least one index for the barring information set included in the explicit barring list does not correspond to the at least one barring information set included in the first information.

6. The method of claim 1, wherein the at least one barring information set includes at least one of a barring factor, a barring time, or barring information for an access identity.

7. A method, performed by a base station in a wireless communication system, the method comprising:
   identifying whether to use an implicit barring list or an explicit barring list;
   generating system information comprising first information on at least one barring information set and second information on at least one access category specific barring configuration per public land mobile network (PLMN), wherein the second information includes information on a barring list type, and the information on the barring list type includes the implicit barring list or the explicit barring list; and
   transmitting, to a terminal, the system information,
   wherein, in case that the implicit barring list is used, the second information includes the implicit barring list and the implicit barring list includes at least one index for a barring information set, and
   wherein, in case that the explicit barring list is used, the second information includes the explicit barring list and the explicit barring list includes at least one access category and at least one index for a barring information set.

8. A terminal comprising:
   a communication unit; and
   a controller configured to:
      receive, from a base station via the communication unit, system information comprising first information on at least one barring information set and second information on at least one access category specific barring configuration per public land mobile network (PLMN), wherein the second information includes information on a barring list type, and the information on the barring list type includes an implicit barring list or an explicit barring list, and
      in case that the information on the barring list type includes the implicit barring list, determine whether to perform an access barring check based on the implicit barring list and the first information,
   wherein the access barring check is performed in case that at least one index for the barring information set included in the implicit barring list corresponds to the at least one barring information set included in the first information.

9. The terminal of claim 8, wherein the second information further includes an index for PLMN identity.

10. The terminal of claim 8, wherein the access barring check is not performed, in case that the at least one index for the barring information set included in the implicit barring list does not correspond to the at least one barring information set included in the first information.

11. The terminal of claim 8, wherein
   the controller is further configured to:
   in case that the information on the barring list type includes the explicit barring list, determine whether to perform the access barring check based on the explicit barring list and the first information,
   wherein the access barring check is performed in case that the at least one index for the barring information set included in the explicit barring list corresponds to the at least one barring information set included in the first information.

12. The terminal of claim 11, wherein the access barring check is not performed in case that the at least one index for the barring information set included in the explicit barring list does not correspond to the at least one barring information set included in the first information.

13. The terminal of claim 8, wherein the at least one barring information set includes at least one of a barring factor, a barring time, or barring information for an access identity.

14. A base station comprising:
   a communication unit; and
   a controller configured to:
      identify whether to use an implicit barring list or an explicit barring list,
      generate system information comprising first information on at least one barring information set and second information on at least one access category specific barring configuration per public land mobile network (PLMN), wherein the second information includes information on a barring list type, and the information on the barring list type includes the implicit barring list or the explicit barring list, transmit, to a terminal via the communication unit, the system information, wherein, in case that the implicit barring list is used, the second information includes the implicit barring list and the implicit barring list includes at least one first index for a barring information set, and wherein, in case that the explicit barring list is used, the second information includes the explicit barring list and the explicit barring list includes at least one access category and at least one second index for a barring information set.

15. The method of claim 7, wherein the second information further includes an index for PLMN identity.

16. The method of claim 7, wherein the at least one barring information set includes at least one of a barring factor, a barring time or barring information for an access identity.

17. The base station of claim 14, wherein the second information further includes an index for PLMN identity.

18. The base station of claim 14, wherein the at least one barring information set includes at least one of a barring factor, a barring time or barring information for an access identity.

* * * * *